US012620157B2

(12) United States Patent
Krishnan Gorumkonda et al.

(10) Patent No.: US 12,620,157 B2
(45) Date of Patent: May 5, 2026

(54) AVATAR DANCE ANIMATION SYSTEM

(71) Applicant: Snap Inc., Santa Monica, CA (US)

(72) Inventors: Gurunandan Krishnan Gorumkonda, Kirkland, WA (US); Shree K. Nayar, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/525,291

(22) Filed: Nov. 30, 2023

(65) Prior Publication Data

US 2024/0177390 A1 May 30, 2024

Related U.S. Application Data

(60) Provisional application No. 63/385,611, filed on Nov. 30, 2022.

(51) Int. Cl.
*G06T 13/40* (2011.01)
*G06T 13/20* (2011.01)
(52) U.S. Cl.
CPC ............ *G06T 13/40* (2013.01); *G06T 13/205* (2013.01)
(58) Field of Classification Search
CPC .............................. G06T 13/40; G06T 13/205
USPC ......................................................... 345/473
See application file for complete search history.

(56) References Cited

U.S. PATENT DOCUMENTS

| | | | |
|---|---|---|---|
| 6,285,380 B1 | 9/2001 | Perlin et al. | |
| 6,353,170 B1 | 3/2002 | Eyzaguirre et al. | |
| 6,456,334 B1 | 9/2002 | Duhault | |
| 6,552,729 B1 | 4/2003 | Di et al. | |
| 6,600,491 B1 | 7/2003 | Szeliski et al. | |
| 6,993,462 B1 | 1/2006 | Pavlovic et al. | |
| 7,472,910 B1 | 1/2009 | Okada et al. | |
| 8,154,544 B1 | 4/2012 | Cameron et al. | |
| 9,358,456 B1 | 6/2016 | Challinor et al. | |

(Continued)

FOREIGN PATENT DOCUMENTS

| | | |
|---|---|---|
| CN | 102568023 A | 7/2012 |
| CN | 110853670 A | 2/2020 |

(Continued)

OTHER PUBLICATIONS

Alemi et al.; "GrooveNet: Real-Time Music-Driven Dance Movement Generation using Artificial Neural Networks"; Aug. 2017 (Year: 2017).*

(Continued)

*Primary Examiner* — David T Welch
(74) *Attorney, Agent, or Firm* — Schwegman Lundberg & Woessner, P.A.

(57) ABSTRACT

Method of generating a real-time avatar animation starts with a processor receiving acoustic segments of a real-time acoustic signal. For each of the acoustic segments, processor generates using a music analyzer neural network a tempo value and a dance energy category and selects dance tracks based on the tempo value and the dance energy category. Processor generates using the dance tracks dance sequences for avatars, generates real-time animations for the avatars based on the dance sequences and avatar characteristics for the avatars, and causes to be displayed on a first client device the real-time animations of the avatars. Other embodiments are described herein.

21 Claims, 11 Drawing Sheets
(1 of 11 Drawing Sheet(s) Filed in Color)

(56) References Cited

U.S. PATENT DOCUMENTS

| | | | |
|---|---|---|---|
| 9,753,925 B2 | 9/2017 | Cremer et al. | |
| 9,789,392 B1 | 10/2017 | Lotzer | |
| 9,827,496 B1 | 11/2017 | Zinno | |
| 10,535,174 B1 | 1/2020 | Rigiroli et al. | |
| 11,176,723 B2 | 11/2021 | Krishnan Gorumkonda et al. | |
| 11,222,455 B2 | 1/2022 | Krishnan Gorumkonda et al. | |
| 11,282,253 B2 | 3/2022 | Krishnan Gorumkonda et al. | |
| 11,348,297 B2 | 5/2022 | Krishnan Gorumkonda et al. | |
| 11,670,027 B2 | 6/2023 | Krishnan Gorumkonda et al. | |
| 11,790,585 B2 | 10/2023 | Krishnan Gorumkonda et al. | |
| 11,810,236 B2 | 11/2023 | Krishnan Gorumkonda et al. | |
| 11,816,773 B2 | 11/2023 | Krishnan Gorumkonda et al. | |
| 12,106,412 B2 | 10/2024 | Krishnan Gorumkonda et al. | |
| 12,293,444 B2 | 5/2025 | Krishnan Gorumkonda et al. | |
| 12,299,793 B2 | 5/2025 | Krishnan Gorumkonda et al. | |
| 12,488,525 B2 | 12/2025 | Gorumkonda et al. | |
| 2003/0179204 A1 | 9/2003 | Mochizuki et al. | |
| 2006/0274070 A1 | 12/2006 | Herman et al. | |
| 2007/0159049 A1 | 7/2007 | Kim et al. | |
| 2008/0087621 A1 | 4/2008 | Zang et al. | |
| 2009/0002377 A1* | 1/2009 | Lee | G06T 13/40 |
| | | | 345/473 |
| 2010/0082345 A1 | 4/2010 | Wang et al. | |
| 2011/0293144 A1 | 12/2011 | Rahardja et al. | |
| 2012/0086855 A1 | 4/2012 | Xu et al. | |
| 2012/0130717 A1 | 5/2012 | Xu et al. | |
| 2012/0143358 A1 | 6/2012 | Adams et al. | |
| 2013/0069957 A1 | 3/2013 | Xie et al. | |
| 2015/0057779 A1 | 2/2015 | Saungsomboon et al. | |
| 2015/0120851 A1 | 4/2015 | Kimura et al. | |
| 2017/0206697 A1 | 7/2017 | Mckenzie et al. | |
| 2017/0285918 A1 | 10/2017 | Shah et al. | |
| 2018/0012407 A1 | 1/2018 | Chuang et al. | |
| 2018/0335928 A1 | 11/2018 | Van Os et al. | |
| 2019/0026932 A1 | 1/2019 | Kishi et al. | |
| 2019/0043239 A1 | 2/2019 | Goel et al. | |
| 2019/0079597 A1 | 3/2019 | Kada et al. | |
| 2019/0258932 A1 | 8/2019 | Kang et al. | |
| 2020/0167984 A1 | 5/2020 | Cappello et al. | |
| 2020/0294299 A1 | 9/2020 | Rigiroll et al. | |
| 2020/0342646 A1 | 10/2020 | Wang et al. | |
| 2021/0097742 A1 | 4/2021 | Krishnan Gorumkonda et al. | |
| 2021/0097743 A1 | 4/2021 | Krishnan Gorumkonda et al. | |
| 2021/0097744 A1 | 4/2021 | Gorumkonda et al. | |
| 2021/0097746 A1 | 4/2021 | Krishnan Gorumkonda et al. | |
| 2021/0312682 A1 | 10/2021 | Krishnan Gorumkonda et al. | |
| 2021/0312690 A1 | 10/2021 | Krishnan Gorumkonda et al. | |
| 2021/0400142 A1* | 12/2021 | Jorasch | H04L 65/1069 |
| 2022/0067983 A1 | 3/2022 | Fidler et al. | |
| 2022/0101586 A1 | 3/2022 | Krishnan Gorumkonda et al. | |
| 2022/0137724 A1 | 5/2022 | Schliemann et al. | |
| 2022/0148246 A1 | 5/2022 | Krishnan Gorumkonda et al. | |
| 2023/0024562 A1 | 1/2023 | Krishnan Gorumkonda et al. | |
| 2023/0033694 A1 | 2/2023 | Mcdonald et al. | |
| 2023/0090253 A1* | 3/2023 | Meadows | H04L 67/12 |
| | | | 345/419 |
| 2023/0260180 A1 | 8/2023 | Gorumkonda et al. | |
| 2023/0356085 A1* | 11/2023 | Hall | A63F 13/44 |
| 2023/0419578 A1 | 12/2023 | Krishnan Gorumkonda et al. | |
| 2024/0013467 A1 | 1/2024 | Krishnan Gorumkonda et al. | |
| 2024/0054709 A1 | 2/2024 | Gorumkonda et al. | |
| 2025/0238987 A1 | 7/2025 | Gorumkonda et al. | |
| 2026/0065571 A1 | 3/2026 | Krishnan Gorumkonda et al. | |

FOREIGN PATENT DOCUMENTS

| | | | |
|---|---|---|---|
| CN | 111104964 A | 5/2020 | |
| CN | 114503165 A | 5/2022 | |
| CN | 116830158 A | 9/2023 | |
| CN | 116830158 B | 9/2024 | |
| CN | 119169158 A | 12/2024 | |
| DE | 102012111304 A1 | 5/2014 | |
| JP | 2007316842 A | 12/2007 | |
| KR | 20110070058 A | 6/2011 | |

| | | | |
|---|---|---|---|
| KR | 20140005233 A | 1/2014 | |
| KR | 102738240 B1 | 11/2024 | |
| RU | 2708027 C1 | 12/2019 | |
| WO | WO-2008087621 A1 | 7/2008 | |
| WO | WO-2019084481 A1 | 5/2019 | |
| WO | WO-2021067988 A1 | 4/2021 | |
| WO | WO-20220723281 | 4/2022 | |

OTHER PUBLICATIONS

U.S. Appl. No. 16/588,446 U.S. Pat. No. 11,176,723, filed Sep. 30, 2019, Automated Dance Animation.

U.S. Appl. No. 17/526,540 U.S. Pat. No. 11,670,027, filed Nov. 15, 2021, Automated Dance Animation.

U.S. Appl. No. 18/306,732, filed Apr. 25, 2023, Automated Dance Animation.

U.S. Appl. No. 16/588,412 U.S. Pat. No. 11,348,297, filed Sep. 30, 2019, State-Space System for Pseudorandom Animation.

U.S. Appl. No. 17/804,430 U.S. Pat. No. 11,790,585, filed May 27, 2022, State-Space System for Pseudorandom Animation.

U.S. Appl. No. 18/242,964, filed Sep. 6, 2023, State-Space System for Pseudorandom Animation.

U.S. Appl. No. 16/588,373 U.S. Pat. No. 11,222,455, filed Sep. 30, 2019, Management of Pseudorandom Animation System.

U.S. Appl. No. 17/350,975 U.S. Pat. No. 11,810,236, filed Jun. 17, 2021, Management of Pseudorandom Animation System.

U.S. Appl. No. 18/371,356, filed Sep. 21, 2023, Management of Pseudorandom Animation System.

U.S. Appl. No. 16/588,329 U.S. Pat. No. 11,282,253, filed Sep. 30, 2019, Matching Audio to a State-Space Model for Pseudorandom Animation.

U.S. Appl. No. 17/350,954, filed Jun. 17, 2021, Matching Audio to a State-Space Model for Pseudorandom Animation.

U.S. Appl. No. 17/487,558 U.S. Pat. No. 11,816,773, filed Sep. 28, 2021, Music Reactive Animation of Human Characters.

U.S. Appl. No. 18/482,634, filed Oct. 6, 2023, Music Reactive Animation of Human Characters.

"U.S. Appl. No. 16/588,329, 312 Amendment filed Jun. 3, 2021", 2 pgs.

"U.S. Appl. No. 16/588,329, Corrected Notice of Allowability mailed Nov. 16, 2021", 3 pgs.

"U.S. Appl. No. 16/588,329, Non Final Office Action mailed Nov. 10, 2020", 15 pgs.

"U.S. Appl. No. 16/588,329, Notice of Allowance mailed Mar. 3, 2021", 9 pgs.

"U.S. Appl. No. 16/588,329, Notice of Allowance mailed Nov. 5, 2021", 6 pgs.

"U.S. Appl. No. 16/588,329, PTO Response to Rule 312 Communication mailed Jun. 3, 2021", 2 pgs.

"U.S. Appl. No. 16/588,329, Response filed Feb. 10, 2021 to Non Final Office Action mailed Nov. 10, 2020", 11 pgs.

"U.S. Appl. No. 16/588,373, Advisory Action mailed Dec. 16, 2020", 5 pgs.

"U.S. Appl. No. 16/588,373, Corrected Notice of Allowability mailed Jun. 16, 2021", 2 pgs.

"U.S. Appl. No. 16/588,373, Corrected Notice of Allowability mailed Oct. 27, 2021", 2 pgs.

"U.S. Appl. No. 16/588,373, Final Office Action mailed Oct. 23, 2020", 26 pgs.

"U.S. Appl. No. 16/588,373, Non Final Office Action mailed Sep. 15, 2020", 19 pgs.

"U.S. Appl. No. 16/588,373, Notice of Allowance mailed Mar. 22, 2021", 11 pgs.

"U.S. Appl. No. 16/588,373, Notice of Allowance mailed Aug. 25, 2021", 11 pgs.

"U.S. Appl. No. 16/588,373, Response filed Oct. 12, 2020 to Non Final Office Action mailed Sep. 15, 2020", 10 pgs.

"U.S. Appl. No. 16/588,373, Response filed Dec. 8, 2020 to Final Office Action mailed Oct. 23, 2020", 10 pgs.

"U.S. Appl. No. 16/588,412, Final Office Action mailed May 17, 2021", 31 pgs.

"U.S. Appl. No. 16/588,412, Non Final Office Action mailed Mar. 17, 2021", 30 pgs.

(56) References Cited

OTHER PUBLICATIONS

"U.S. Appl. No. 16/588,412, Notice of Allowance mailed Jan. 28, 2022", 11 pgs.

"U.S. Appl. No. 16/588,412, Notice of Allowance mailed Oct. 4, 2021", 10 pgs.

"U.S. Appl. No. 16/588,412, Response filed Apr. 19, 2021 to Non Final Office Action mailed Mar. 17, 2021", 12 pgs.

"U.S. Appl. No. 16/588,412, Response filed Sep. 17, 2021 to Final Office Action mailed May 17, 2021", 12 pgs.

"U.S. Appl. No. 16/588,412, Supplemental Notice of Allowability mailed Feb. 10, 2022", 3 pgs.

"U.S. Appl. No. 16/588,446, Non Final Office Action mailed Mar. 24, 2021", 20 pgs.

"U.S. Appl. No. 16/588,446, Notice of Allowance mailed Jul. 14, 2021", 9 pgs.

"U.S. Appl. No. 16/588,446, Response filed Jun. 24, 2021 to Non Final Office Action mailed Mar. 24, 2021", 10 pgs.

"U.S. Appl. No. 16/588,446, Supplemental Notice of Allowability mailed Jul. 26, 2021", 2 pgs.

"U.S. Appl. No. 17/350,954, Advisory Action mailed Nov. 22, 2022", 4 pgs.

"U.S. Appl. No. 17/350,954, Examiner Interview Summary mailed Mar. 22, 2024", 2 pgs.

"U.S. Appl. No. 17/350,954, Examiner Interview Summary mailed Apr. 21, 2023", 2 pgs.

"U.S. Appl. No. 17/350,954, Final Office Action mailed Jun. 30, 2023", 29 pgs.

"U.S. Appl. No. 17/350,954, Final Office Action mailed Sep. 9, 2022", 25 pgs.

"U.S. Appl. No. 17/350,954, Non Final Office Action mailed Jan. 19, 2024", 6 pgs.

"U.S. Appl. No. 17/350,954, Non Final Office Action mailed Jan. 26, 2023", 25 pgs.

"U.S. Appl. No. 17/350,954, Non Final Office Action mailed May 11, 2022", 21 pgs.

"U.S. Appl. No. 17/350,954, Response filed Apr. 4, 2024 to Non Final Office Action mailed Jan. 19, 2024", 9 pgs.

"U.S. Appl. No. 17/350,954, Response filed Apr. 24, 2023 to Non Final Office Action mailed Jan. 26, 2023", 10 pgs.

"U.S. Appl. No. 17/350,954, Response filed Aug. 11, 2022 to Non Final Office Action mailed May 11, 2022", 9 pgs.

"U.S. Appl. No. 17/350,954, Response filed Nov. 9, 2022 to Final Office Action mailed Sep. 9, 2022", 8 pgs.

"U.S. Appl. No. 17/350,954, Response filed Nov. 30, 2023 to Final Office Action mailed Jun. 30, 2023", 10 pgs.

"U.S. Appl. No. 17/350,975, Corrected Notice of Allowability mailed Oct. 2, 2023", 2 pgs.

"U.S. Appl. No. 17/350,975, Examiner Interview Summary mailed May 3, 2023", 2 pgs.

"U.S. Appl. No. 17/350,975, Examiner Interview Summary mailed Dec. 13, 2022", 2 pgs.

"U.S. Appl. No. 17/350,975, Final Office Action mailed Feb. 1, 2023", 28 pgs.

"U.S. Appl. No. 17/350,975, Non Final Office Action mailed Sep. 8, 2022", 19 pgs.

"U.S. Appl. No. 17/350,975, Notice of Allowance mailed Jun. 22, 2023", 9 pgs.

"U.S. Appl. No. 17/350,975, Response filed May 1, 2023 to Final Office Action mailed Feb. 1, 2023", 12 pgs.

"U.S. Appl. No. 17/350,975, Response filed Dec. 8, 2022 to Non Final Office Action mailed Sep. 8, 2022", 12 pgs.

"U.S. Appl. No. 17/487,558, Examiner Interview Summary mailed Jun. 5, 2023", 2 pgs.

"U.S. Appl. No. 17/487,558, Non Final Office Action mailed May 3, 2023", 33 pgs.

"U.S. Appl. No. 17/487,558, Notice of Allowance mailed Jul. 6, 2023", 9 pgs.

"U.S. Appl. No. 17/487,558, Response filed Jun. 5, 2023 to Non Final Office Action mailed Mar. 3, 2023", 10 pgs.

"U.S. Appl. No. 17/526,540, Non Final Office Action mailed Sep. 23, 2022", 15 pgs.

"U.S. Appl. No. 17/526,540, Notice of Allowability mailed May 3, 2023", 2 pgs.

"U.S. Appl. No. 17/526,540, Notice of Allowance mailed Jan. 25, 2023", 10 pgs.

"U.S. Appl. No. 17/526,540, Response filed Dec. 20, 2022 to Non Final Office Action mailed Sep. 23, 2022", 9 pgs.

"U.S. Appl. No. 17/804,430, Non Final Office Action mailed Feb. 2, 2023", 18 pgs.

"U.S. Appl. No. 17/804,430, Notice of Allowance mailed Jun. 13, 2023", 9 pgs.

"U.S. Appl. No. 17/804,430, Preliminary Amendment filed Oct. 11, 2022", 10 pgs.

"U.S. Appl. No. 17/804,430, Response filed May 2, 2023 to Non Final Office Action mailed Feb. 2, 2023", 11 pgs.

"U.S. Appl. No. 18/482,634, Preliminary Amendment filed Nov. 3, 2023", 6 pgs.

"Chinese Application Serial No. 202180067185.6, Notification to Make Rectification (210302) mailed Jun. 13, 2023", With Concise Statement, 2 pgs.

"Chinese Application Serial No. 202180067185.6, Office Action mailed Mar. 7, 2024", W/English Translation, 14 pgs.

"Chinese Application Serial No. 202180067185.6, Voluntary Amendment filed Jan. 5, 2024", W/English Claims, 10 pgs.

"Forward Kinematics", Wikipedia, [Online] Retrieved from the Internet: <URL: https://web.archive.org/web/20181115030912/https://en.wikipedia.org/wiki/Forward_kinematics>, (2018), 4 pgs.

"International Application Serial No. PCT/US2020/070586, International Preliminary Report on Patentability mailed Apr. 14, 2022", 12 pgs.

"International Application Serial No. PCT/US2020/070586, International Search Report mailed Mar. 9, 2021", 7 pgs.

"International Application Serial No. PCT/US2020/070586, Invitation to Pay Additional Fees mailed Dec. 11, 2020", 13 pgs.

"International Application Serial No. PCT/US2020/070586, Written Opinion mailed Mar. 9, 2021", 10 pgs.

"International Application Serial No. PCT/US2021/052364, International Preliminary Report on Patentability mailed Apr. 13, 2023", 8 pgs.

"International Application Serial No. PCT/US2021/052364, International Search Report mailed Dec. 23, 2021", 4 pgs.

"International Application Serial No. PCT/US2021/052364, Written Opinion mailed Dec. 23, 2021", 6 pgs.

"Korean Application Serial No. 10-2022-7014193, Notice of Preliminary Rejection mailed Dec. 18, 2023", w/ English translation, 13 pgs.

"Korean Application Serial No. 10-2022-7014193, Response filed Feb. 19, 2024 to Notice of Preliminary Rejection mailed Dec. 18, 2023", w/ current English claims, 32 pgs.

"Tempi for iPhone/iPad/Mac—Improve your rhythm and tempo.", [Online]. Retrieved from the Internet: <https://madebywindmill.com/tempi/>, (2020), 3 pgs.

Bock, Sebastian, et al., "Accurate Tempo Estimation based on Recurrent Neural Networks and Resonating Comb Filters", Proceedings of the 16th ISMIR Conference, Malaga, Spain, (2015), 625-631.

Ellis, Daniel P.W, "Beat Tracking by Dynamic Programming", Journal of New Music Research, 36:1, 51-60, DOI: 10.1080/09298210701653344, (2007), 21 pgs.

Shiratori, et al., "Dancing-to-Music Character Animation", EUROGRAPHICS 2006, vol. 25., No. 3, (2006), 10 pgs.

"U.S. Appl. No. 17/350,954, Corrected Notice of Allowability mailed Aug. 28, 2024", 2 pgs.

"U.S. Appl. No. 17/350,954, Notice of Allowance mailed May 23, 2024", 7 pgs.

"U.S. Appl. No. 18/242,964, Advisory Action mailed Sep. 30, 2025", 3 pgs.

"U.S. Appl. No. 18/242,964, Examiner Interview Summary mailed Jul. 1, 2025", 2 pgs.

"U.S. Appl. No. 18/242,964, Examiner Interview Summary mailed Sep. 3, 2025", 2 pgs.

(56)　　　　References Cited

OTHER PUBLICATIONS

"U.S. Appl. No. 18/242,964, Final Office Action mailed Jul. 30, 2025", 31 pgs.

"U.S. Appl. No. 18/242,964, Non Final Office Action mailed Apr. 17, 2025", 51 pgs.

"U.S. Appl. No. 18/242,964, Response filed Jul. 16, 2025 to Non Final Office Action mailed Apr. 17, 2025", 12 pgs.

"U.S. Appl. No. 18/242,964, Response filed Sep. 19, 2025 to Final Office Action mailed Jul. 30, 2025", 13 pgs.

"U.S. Appl. No. 18/306,732, Non Final Office Action mailed Aug. 16, 2024", 46 pgs.

"U.S. Appl. No. 18/306,732, Notice of Allowability mailed Jan. 29, 2025", 2 pgs.

"U.S. Appl. No. 18/306,732, Notice of Allowance mailed Jan. 17, 2025", 15 pgs.

"U.S. Appl. No. 18/306,732, Response filed Nov. 18, 2024 to Non Final Office Action mailed Aug. 16, 2024", 9 pgs.

"U.S. Appl. No. 18/371,356, Corrected Notice of Allowability mailed Aug. 14, 2025", 2 pgs.

"U.S. Appl. No. 18/371,356, Examiner Interview Summary mailed Feb. 26, 2025", 2 pgs.

"U.S. Appl. No. 18/371,356, Examiner Interview Summary mailed May 28, 2025", 2 pgs.

"U.S. Appl. No. 18/371,356, Final Office Action mailed Apr. 11, 2025", 25 pgs.

"U.S. Appl. No. 18/371,356, Non Final Office Action mailed Dec. 6, 2024", 28 pgs.

"U.S. Appl. No. 18/371,356, Notice of Allowance mailed Aug. 6, 2025", 10 pgs.

"U.S. Appl. No. 18/371,356, Response filed Mar. 6, 2025 to Non Final Office Action mailed Dec. 6, 2024", 9 pgs.

"U.S. Appl. No. 18/371,356, Response filed Jun. 9, 2025 to Final Office Action mailed Apr. 11, 2025", 9 pgs.

"U.S. Appl. No. 18/482,634, Corrected Notice of Allowability mailed Jan. 16, 2025", 2 pgs.

"U.S. Appl. No. 18/482,634, Corrected Notice of Allowability mailed Feb. 7, 2025", 2 pgs.

"U.S. Appl. No. 18/482,634, Examiner Interview Summary mailed Nov. 4, 2024", 2 pgs.

"U.S. Appl. No. 18/482,634, Non Final Office Action mailed Aug. 8, 2024", 46 pgs.

"U.S. Appl. No. 18/482,634, Notice of Allowance mailed Jan. 8, 2025", 9 pgs.

"U.S. Appl. No. 18/482,634, Response filed Nov. 5, 2024 to Non Final Office Action mailed Aug. 8, 2024", 10 pgs.

"Chinese Application Serial No. 202080068708.4, Office Action mailed May 29, 2025", w/o English translation, 2 pgs.

"Chinese Application Serial No. 202080068708.4, Office Action mailed Nov. 22, 2024", w/ English translation, 11 pgs.

"Chinese Application Serial No. 202080068708.4, Response filed Mar. 18, 2025 to Office Action mailed Nov. 22, 2024", w/ English Claims, 42 pgs.

"Chinese Application Serial No. 202080068708.4, Response filed Jul. 17, 2025 to Office Action mailed May 29, 2025", w/o English Translation, 4 pgs.

"Chinese Application Serial No. 202180067185.6, Response filed Jun. 28, 2024 to Office Action mailed Mar. 7, 2024", w/ current English claims, 48 pgs.

"European Application Serial No. 20789423.9, Communication Pursuant to Article 94(3) EPC mailed Nov. 22, 2024", 6 pgs.

"European Application Serial No. 20789423.9, Response filed Mar. 6, 2025 to Communication Pursuant to Article 94(3) EPC mailed Nov. 22, 2024", 12 pgs.

"Korean Application Serial No. 10-2023-7014737, Final Office Action mailed Aug. 29, 2025", W/English Translation, 8 pgs.

"Korean Application Serial No. 10-2023-7014737, Notice of Preliminary Rejection mailed Dec. 27, 2024", w/ English translation, 19 pgs.

"Korean Application Serial No. 10-2023-7014737, Response filed Feb. 13, 2025 to Notice of Preliminary Rejection mailed Dec. 27, 2024", W/English Claims, 24 pgs.

Ahn, Hyemin, et al., "Generative Autoregressive Networks for 3D Dancing Move Synthesis From Music", IEEE Robotics and Automation Letters 5.2, (2020), 3501-3508.

Sun, Guofei, et al., "DeepDance: Music-to-Dance Motion Choreography With Adversarial Learning", IEEE Transactions on Multimedia 23, (2020), 497-509.

"Chinese Application Serial No. 202080068708.4, Office Action mailed Oct. 22, 2025", W/English Translation, 7 pgs.

"Chinese Application Serial No. 202080068708.4, Response filed Dec. 2, 2025 to Office Action mailed Oct. 22, 2025", w/ English Claims, 28 pgs.

"Chinese Application Serial No. 202080068708.4, Office Action mailed Jan. 29, 2026", w/ English Translation, 15 pgs.

"U.S. Appl. No. 18/242,964, Notice of Allowance mailed Mar. 5, 2026", 10 pgs.

* cited by examiner 104　　　　　　　　124　　　　　　　　　　100

Figure 2:
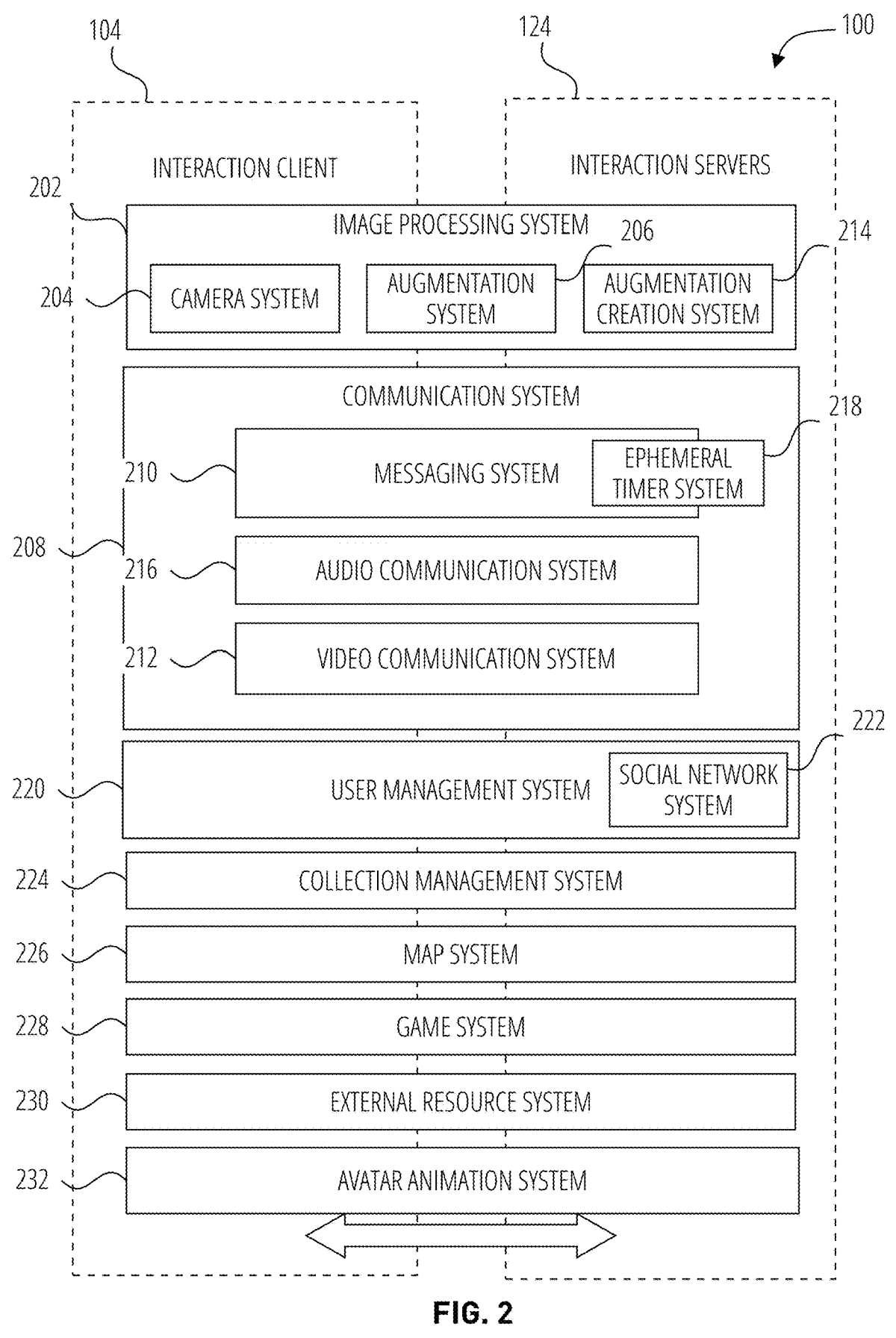

INTERACTION CLIENT　　　　　　　　INTERACTION SERVERS

202

IMAGE PROCESSING SYSTEM　　206　　　　　214

204　　CAMERA SYSTEM　　AUGMENTATION SYSTEM　　AUGMENTATION CREATION SYSTEM

COMMUNICATION SYSTEM　　　　　218

210　　MESSAGING SYSTEM　　EPHEMERAL TIMER SYSTEM

208

216　　AUDIO COMMUNICATION SYSTEM

212　　VIDEO COMMUNICATION SYSTEM

222

220　　USER MANAGEMENT SYSTEM　　SOCIAL NETWORK SYSTEM

224　　COLLECTION MANAGEMENT SYSTEM

226　　MAP SYSTEM

228　　GAME SYSTEM

230　　EXTERNAL RESOURCE SYSTEM

232　　AVATAR ANIMATION SYSTEM

PROFILE DATA

ENTITY
GRAPH        310

MESSAGE
TABLE        306

ENTITY
TABLE        308

312

AUGMENTATION
TABLE

VIDEO
TABLE        314

IMAGE
TABLE        316

STORY
TABLE        318

ANIMATION
TABLE        320

DATABASE

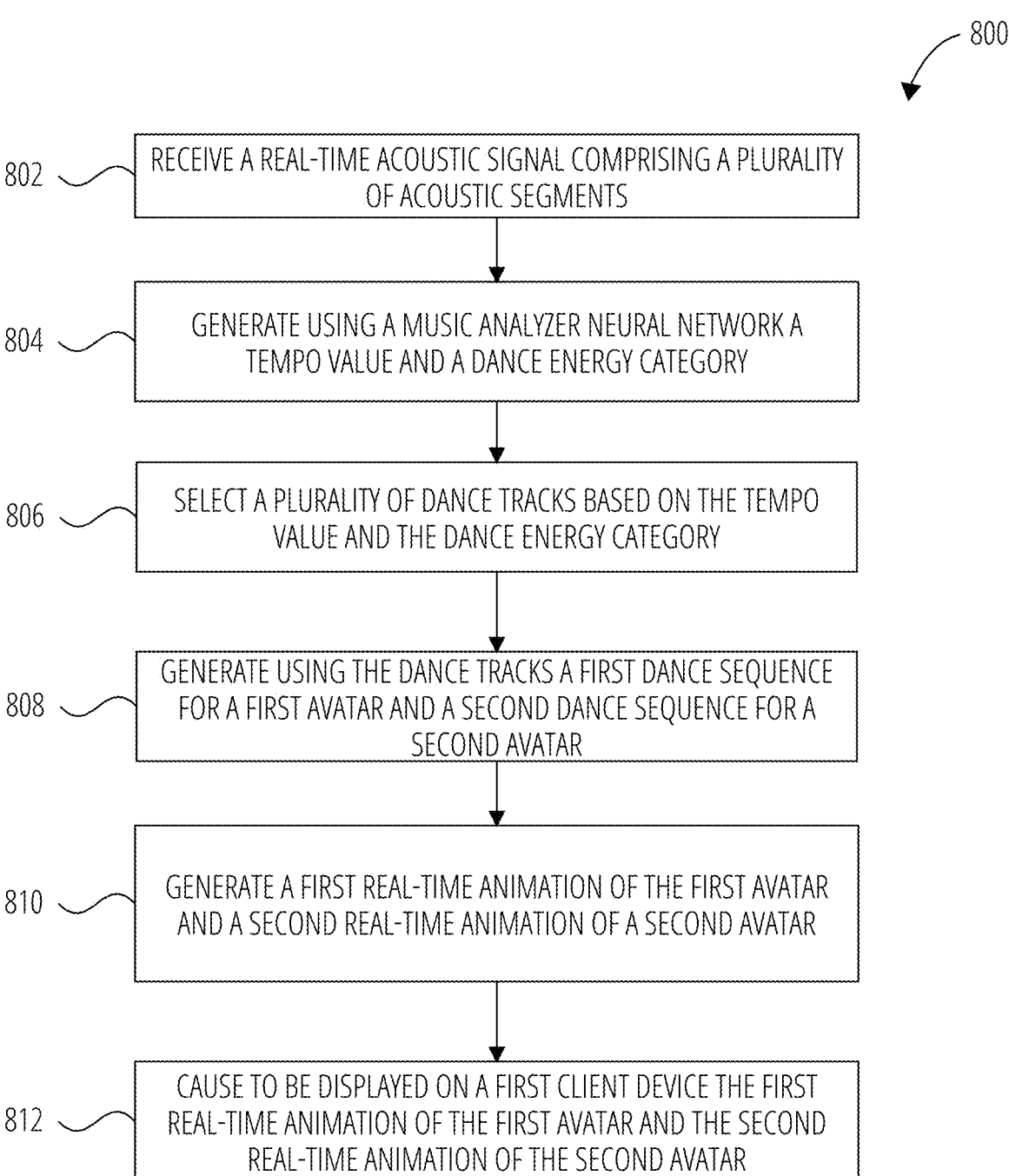

800

802 — RECEIVE A REAL-TIME ACOUSTIC SIGNAL COMPRISING A PLURALITY OF ACOUSTIC SEGMENTS

804 — GENERATE USING A MUSIC ANALYZER NEURAL NETWORK A TEMPO VALUE AND A DANCE ENERGY CATEGORY

806 — SELECT A PLURALITY OF DANCE TRACKS BASED ON THE TEMPO VALUE AND THE DANCE ENERGY CATEGORY

808 — GENERATE USING THE DANCE TRACKS A FIRST DANCE SEQUENCE FOR A FIRST AVATAR AND A SECOND DANCE SEQUENCE FOR A SECOND AVATAR

810 — GENERATE A FIRST REAL-TIME ANIMATION OF THE FIRST AVATAR AND A SECOND REAL-TIME ANIMATION OF A SECOND AVATAR

812 — CAUSE TO BE DISPLAYED ON A FIRST CLIENT DEVICE THE FIRST REAL-TIME ANIMATION OF THE FIRST AVATAR AND THE SECOND REAL-TIME ANIMATION OF THE SECOND AVATAR

FIG. 8

AVATAR DANCE ANIMATION SYSTEM

CROSS REFERENCED TO RELATED APPLICATIONS

This claims priority to U.S. Provisional Patent Application Ser. No. 63/385,611, filed Nov. 30, 2022, the contents of which are incorporated herein by reference in their entirety.

BACKGROUND

The popularity of electronic messaging, augmented reality, and virtual reality continues to grow. Users increasingly use customized avatars within different platforms reflecting a global demand to communicate more visually.

These customized avatars can be personalized by the users to represent the users in various applications, video games, messaging services, etc. Since the customized avatars can be generated in a different array of situations, displaying various emotions, or even be animated, the users are able to communicate their feelings more accurately in messages and on different platforms using the customized avatars and hence, more adequately be represented by proxy using their customized avatars.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee. In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 2 is a diagrammatic representation of a messaging system, according to some examples, that has both client-side and server-side functionality.

FIG. 8 illustrates a process 800 of generating a real-time avatar animation in accordance with one embodiment.

DETAILED DESCRIPTION

Figure 1:
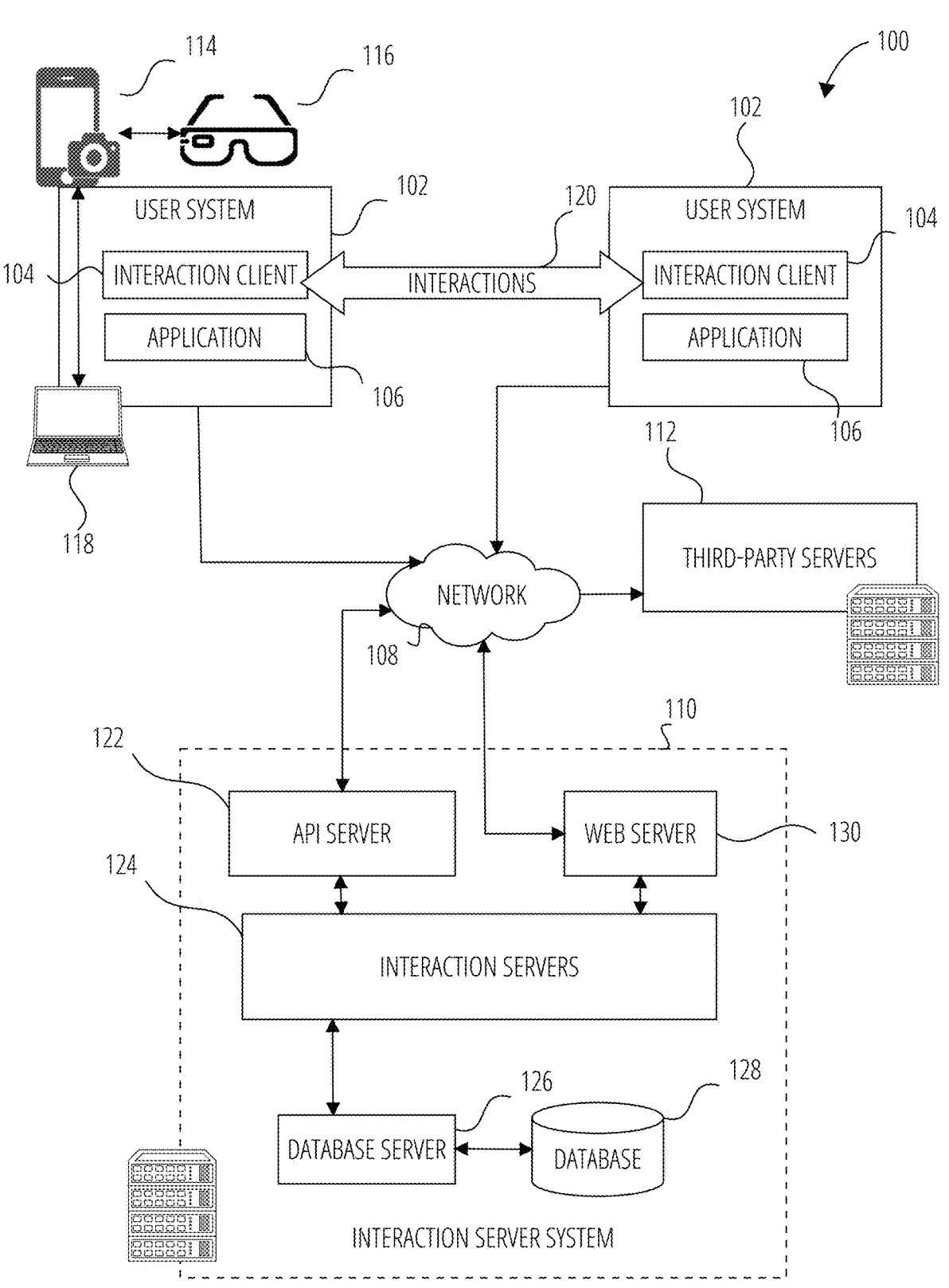
FIG. 1 is a diagrammatic representation of a networked environment in which the present disclosure may be deployed, according to some examples.

Current avatar animation systems can generate dance animations for the avatar to perform based on the music being played. Most of these dance animations are hard-coded and do not take into account the music features of the song being played that should be driving the avatar's dance. Further, the different parts of a given song can also greatly vary in music features such that a more realistic dance animation needs to take into account these changes. The music features can include, for example, tempo, rhythm, melody, harmony, timbre, dynamics, texture, and form.

Embodiments of the present disclosure improve the functionality of dancing animation systems by incorporating in, an avatar animation system, a music analyzer neural network, a dance track selector and a dance synthesizer and a dance animation controller. The music analyzer neural network is configured to generate a tempo value (e.g., beats per minute) and a dance energy category (e.g., idle, slow, lively, or vigorous) for each segment of a song being played which is further used to inform the dance track selector which dance tracks to use in order to realistically animate avatars that are dancing to each segment of a song. Further, in order to generate avatar animations that appear dynamic and varied in contrast to the pre-recorded dances that are repetitive, the dance synthesizer generates dance sequences for the avatars by combining segments of different dance tracks while ensuring that the transitions between the segments are seamless by identifying transition movements in the tracks that are similar. The dance animation controller then generates real-time avatar dancing animations for the avatars using the dance sequences.

The tempo and the level of dance energy of a segment of a song can inform the danceability of that segment, which is defined as the quality or state of being able to be used for dancing. A highly danceable segment of a song is a segment that has the music features that people can dance to at a high pace or vigorously. Based on the level of dance energy, a segment of a song can be categorized (e.g., idle, slow, lively, or vigorous).

The music features can further include, for example, tempo, rhythm, melody, harmony, timbre, dynamics, texture, and form. Using any or combination of these music features, the music analyzer neural network can generate the tempo value and the dance energy category that is used to drive corresponding dance animations. For example, a highly danceable song (e.g., 180 beats per minute and dance energy category: vigorous) may have high paced animations, a low danceability song (e.g., 90 beats per minute and dance energy category: slow) may have very little animation and finally, a song having no possible dancing associated therewith (or an "undanceable song") that, for example, includes just noise or talking (e.g., less than 80 beats per minute and dance energy category: idle), may not drive any animation.

By generating avatar dance animations that realistically correspond to the music being played, embodiments of the avatar animation system described herein will improve the usage of the 2-dimensional or 3-dimensional avatars in different platforms, various applications, augmented reality (AR), virtual reality (VR), video games, and messaging services, for instance and further drive the engagement of the users with these systems.

NETWORKED COMPUTING ENVIRONMENT

FIG. 1 is a block diagram showing an example interaction system 100 for facilitating interactions (e.g., exchanging text messages, conducting text audio and video calls, or playing games) over a network. The interaction system 100 includes multiple client systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 can also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, social network information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the client systems 102 (and, for example, interaction clients

104 and other application 106) and the third-party server 112. Specifically, the Application Program Interface (API) server 122 provides a set of interfaces (e.g., routines and protocols) that can be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity graph (e.g., a social graph); the location of friends within a social graph; and opening an application event (e.g., relating to the interaction client 104).

The interaction servers 124 host multiple systems and subsystems, described below with reference to FIG. 2.

Linked Applications

Returning to the interaction client 104, features and functions of an external resource (e.g., a linked application 106 or applet) are made available to a user via an interface of the interaction client 104. In this context, "external" refers to the fact that the application 106 or applet is external to the interaction client 104. The external resource is often provided by a third party but may also be provided by the creator or provider of the interaction client 104. The interaction client 104 receives a user selection of an option to launch or access features of such an external resource. The external resource may be the application 106 installed on the user system 102 (e.g., a "native app"), or a small-scale version of the application (e.g., an "applet") that is hosted on the user system 102 or remote of the user system 102 (e.g., on third-party servers 112). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the interaction client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the interaction client 104 determines whether the selected external resource is a web-based external resource or a locally-installed application 106. In some cases, applications 106 that are locally installed on the user system 102 can be launched independently of and separately from the interaction client 104, such as by selecting an icon corresponding to the application 106 on a home screen of the user system 102. Small-scale versions of such applications can be launched or accessed via the interaction client 104 and, in some examples, no or limited portions of the small-scale application can be accessed outside of the interaction client 104. The small-scale application can be launched by the interaction client 104 receiving, from a third-party server 112 for example, a markup-language document associated with the small-scale application and processing such a document.

In response to determining that the external resource is a locally-installed application 106, the interaction client 104 instructs the user system 102 to launch the external resource by executing locally-stored code corresponding to the external resource. In response to determining that the external resource is a web-based resource, the interaction client 104 communicates with the third-party servers 112 (for example) to obtain a markup-language document corresponding to the selected external resource. The interaction client 104 then processes the obtained markup-language document to present the web-based external resource within a user interface of the interaction client 104.

The interaction client 104 can notify a user of the user system 102, or other users related to such a user (e.g., "friends"), of activity taking place in one or more external resources. For example, the interaction client 104 can provide participants in a conversation (e.g., a chat session) in the interaction client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective interaction clients 104, with the ability to share an item, status, state, or location in an external resource in a chat session with one or more members of a group of users. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the interaction client 104. The external resource can selectively include different media items in the responses, based on a current context of the external resource.

The interaction client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 902 of a user system 102. These augmentations are selected by the augmentation system 206 and presented to a user of an interaction client 104, based on a number of inputs and data, such as for example:

Geolocation of the user system 102; and

Social network information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that can be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g. artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system 218) that, based on duration and display parameters associated with a message or collection of messages (e.g., a story), selectively enable access (e.g., for presentation and display) to messages and associated content via the interaction client 104. Further details regarding the operation of the ephemeral timer system 218 are provided below. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 220 is operationally responsible for the management of user data and profiles, and includes a social network system 222 that maintains information regarding relationships between users of the interaction system 100.

A collection management system 224 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 224 may also be responsible for publishing an icon that provides notification of a particular collection to the user interface of the interaction client 104. The collection management system 224 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 224 employs machine vision (or image recognition technology) and content rules to curate a content collection automatically. In certain examples, compensation may be paid to a user to include user-generated content into a collection. In such cases, the collection management system 224 operates to automatically make payments to such users to use their content.

A map system 226 provides various geographic location functions and supports the presentation of map-based media content and messages by the interaction client 104. For example, the map system 226 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user can furthermore share his or her location and status information (e.g., using an appropriate status avatar) with other users of the interaction system 100 via the interaction client 104, with this location and status information being similarly displayed within the context of a map interface of the interaction client 104 to selected users.

A game system 228 provides various gaming functions within the context of the interaction client 104. The interaction client 104 provides a game interface providing a list of available games that can be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 230 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that can be called or invoked by the web-based application. The interaction servers 124 host a JavaScript library that provides a given external resource access to specific user data of the interaction client 104. HTML5 is an example of technology for programming games, but applications and resources programmed based on other technologies can be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource can then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A Web ViewJavaScriptBridge running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 can add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The avatar animation system 232 controls animations to be generated in real-time based on the acoustic signals (e.g., songs, music, etc.) being received. The avatar animation system 232 can generate dance animations for the avatars associated with users of the user systems 102. The avatar animation system 232 can further cause the avatar dance animations to be displayed by the user systems 102 (or client systems 102).

Data Architecture

Figure 3:
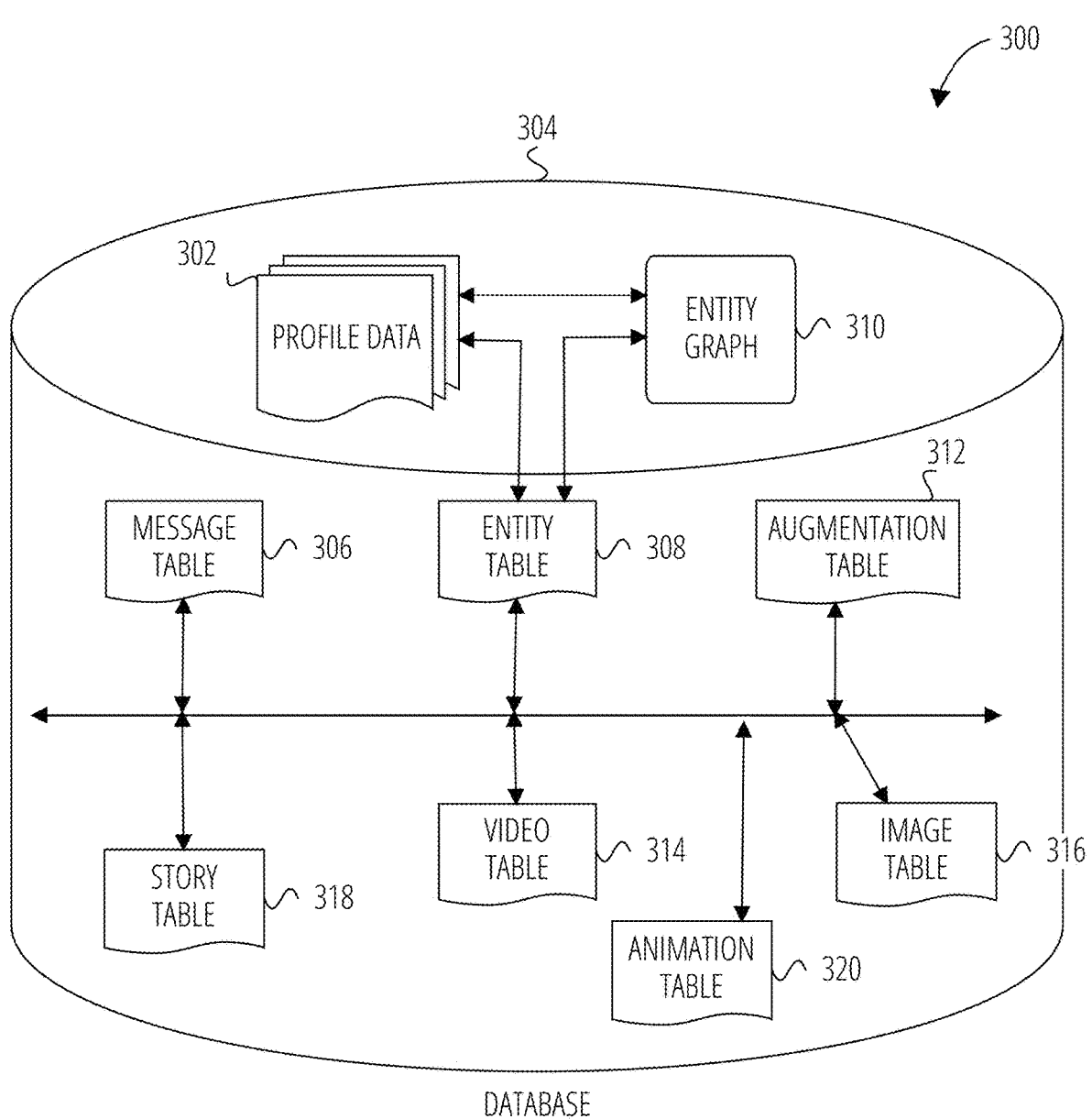
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message, and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users, but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user, and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100, or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A story table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306.

Similarly, the image table 316 stores image data associated with messages for which message data is stored in the entity table 308. The entity table 308 may associate various augmentations from the augmentation table 312 with various images and videos stored in the image table 316 and the video table 314.

The database 304 also includes the animation table 320 that stores animation data including the tempo values and dance energy categories being generated by the music analyzer neural network 502 in association with the corresponding real-time acoustic segments, the test tempo values and test dance energy categories generated by the music analyzer neural network 502 in association with the test acoustic signals, music features (e.g., frequency response, chromagram, tempogram, etc.), dance tracks, dance sequences generated by the dance synthesizer 506, the starting movements, the transition movements, etc. The animation data can further include the test videos including a dancer performing dance movements and the test acoustic signals, the body poses that were determined using the skeletal approximation, avatar body poses, an avatar skeleton, avatar test videos, etc. The animation data can also include real-time animations generated by the dance animation controller 508.

Data Communications Architecture

Figure 4:
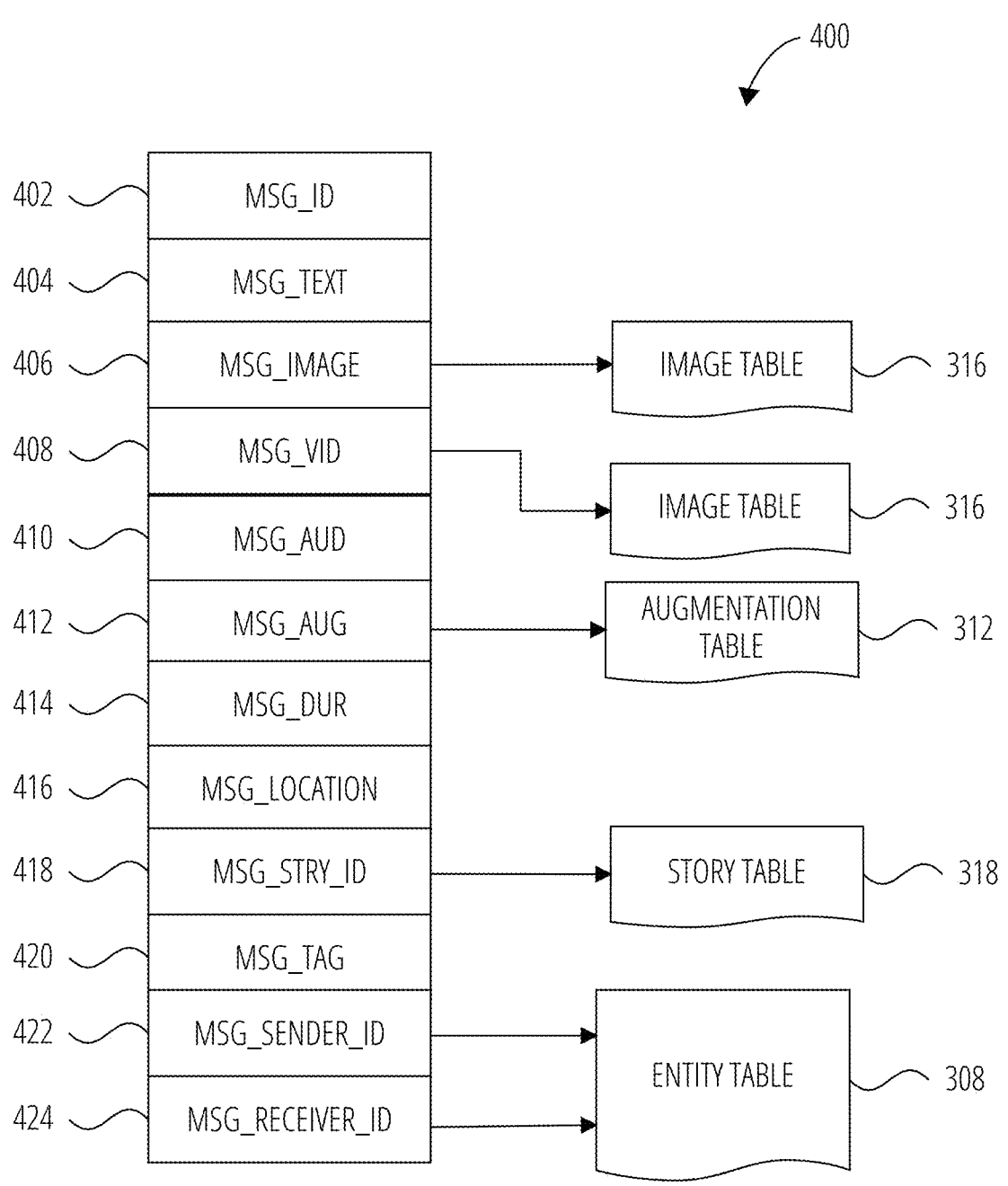
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the story table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a story table 318, and values stored within the message sender identifier 422 and the message receiver identifier 424 may point to user records stored within an entity table 308.

Avatar Animation System

Figure 5:
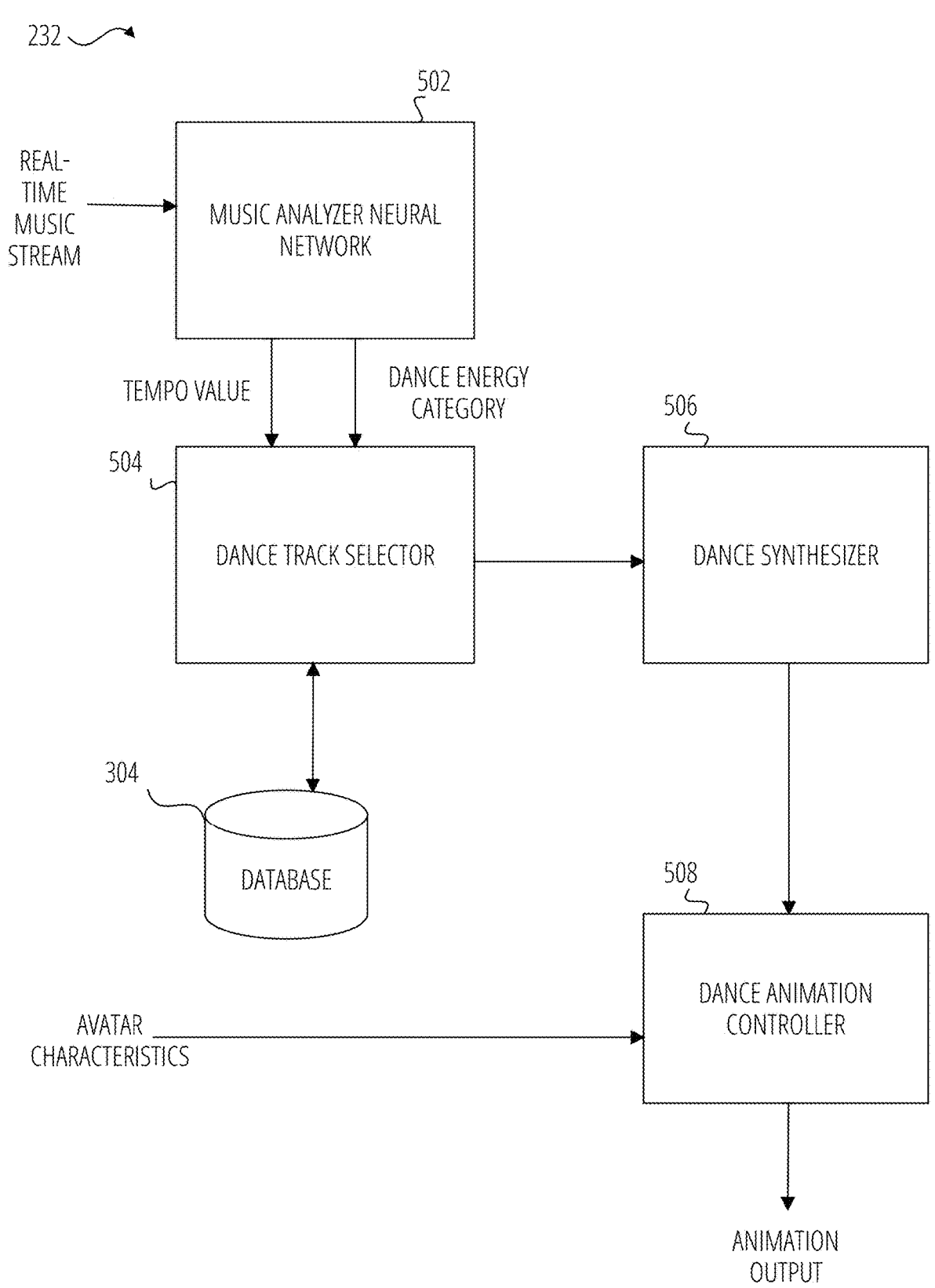
FIG. 5 illustrates details of the avatar animation system 232 in accordance with one embodiment.

FIG. 5 illustrates details of the avatar animation system 232 in accordance with one embodiment. The avatar animation system 232 controls animations to be generated in real-time based on the acoustic signals (e.g., songs, music, etc.) being received. The avatar animation system 232 comprises a music analyzer neural network 502, a dance track selector 504, a dance synthesizer 506, and a dance animation controller 508.

Music Analyzer Neural Network

The music analyzer neural network 502 receives a real-time music stream (e.g., acoustic signals). The real-time music stream can be a song or music that is playing in the background and captured by the microphones of one of the client systems 102. In another example, the real-time music stream is being received in real-time by the interaction server system 110.

The music analyzer neural network 502 generates a tempo value and a dance energy category for each of the acoustic segments in a real-time music stream. The acoustic segments can be, for example, a portion (e.g., 3 seconds) of the real-time music stream. The tempo value can be a value indicating beats per minute, and wherein the dance energy category is one of: idle, slow, lively, or vigorous. The dance energy category is based on the level of energy in the acoustic segment which can be further based on the music features present in the acoustic segment.

The music analyzer neural network 502 can be a Convolutional Neural Network (CNN), a Long Short-Term Memory (LSTM), or any combination thereof. It is understood that the music analyzer neural network 502 can be implemented using any or a combination of types of neural networks (e.g., Perceptron, Feed Forward Neural Network, Multilayer Perceptron, Convolutional Neural Network, Radial Basis Functional Neural Network, Recurrent Neural Network, LSTM—Long Short-Term Memory, Sequence to Sequence Models, Transformer neural network or Modular Neural Network).

Training the Music Analyzer Neural Network

The music analyzer neural network 502 is a deep learning neural network that is trained to predict the tempo value and dance energy category of unheard songs.

In one example, to train the music analyzer neural network, a processor training the music analyzer neural network 502 receives test acoustic signals which can include all or part of songs, audio, sounds, speech etc. The test acoustic signals can also be acoustic signals included in test videos of the expert dancers that are used to generate the dance tracks. The test acoustic signals comprise a plurality of test acoustic segments that are, for example, shorter portions (e.g., 3 seconds) of the test acoustic signals. The dance tracks can be around 45 seconds in length.

The processor determines a plurality of test tempo values associated with the test acoustic segments, and determines the plurality of test dance energy categories corresponding to the test acoustic segments, respectively. The test dance energy categories comprise idle, slow, lively, vigorous. In one example, the processor determines the test dance energy categories corresponding to the test acoustic segments, respectively, based on an analysis of the music features present in the test acoustic segments. The music features comprise frequency response, chromagram, tempogram, or any combination thereof.

The processor associates each of the test acoustic segments with the corresponding test dance energy categories. Using the test acoustic segments and the test tempo values and the test dance energy categories associated with the test acoustic segment, the processor trains the music analyzer neural network 502 generating tempo values and a dance energy category for unheard acoustic segments.

Dance Track Selector

Figure 6:
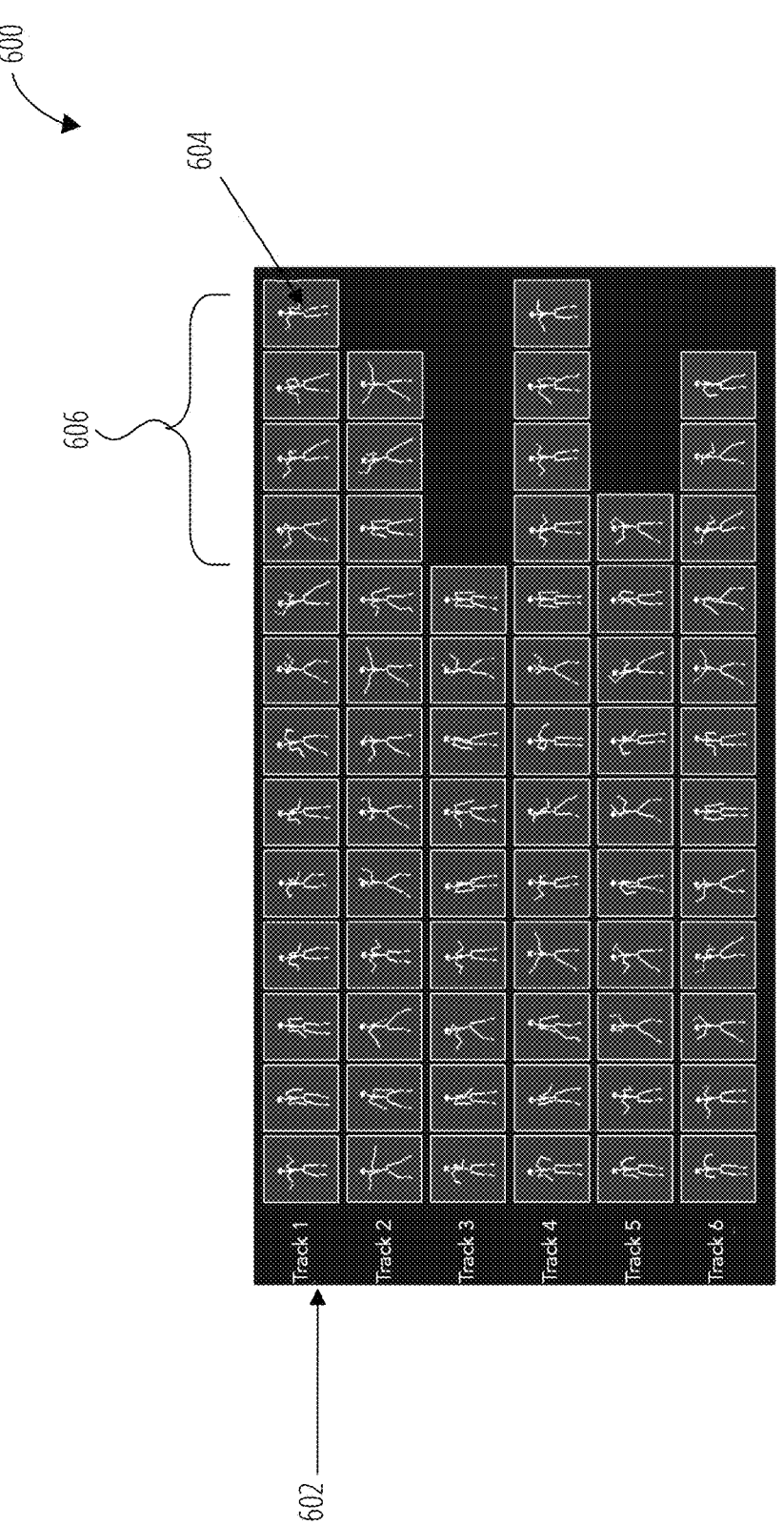
FIG. 6 illustrates an example of a transition graph 600 in accordance with one embodiment.
Figure 7:
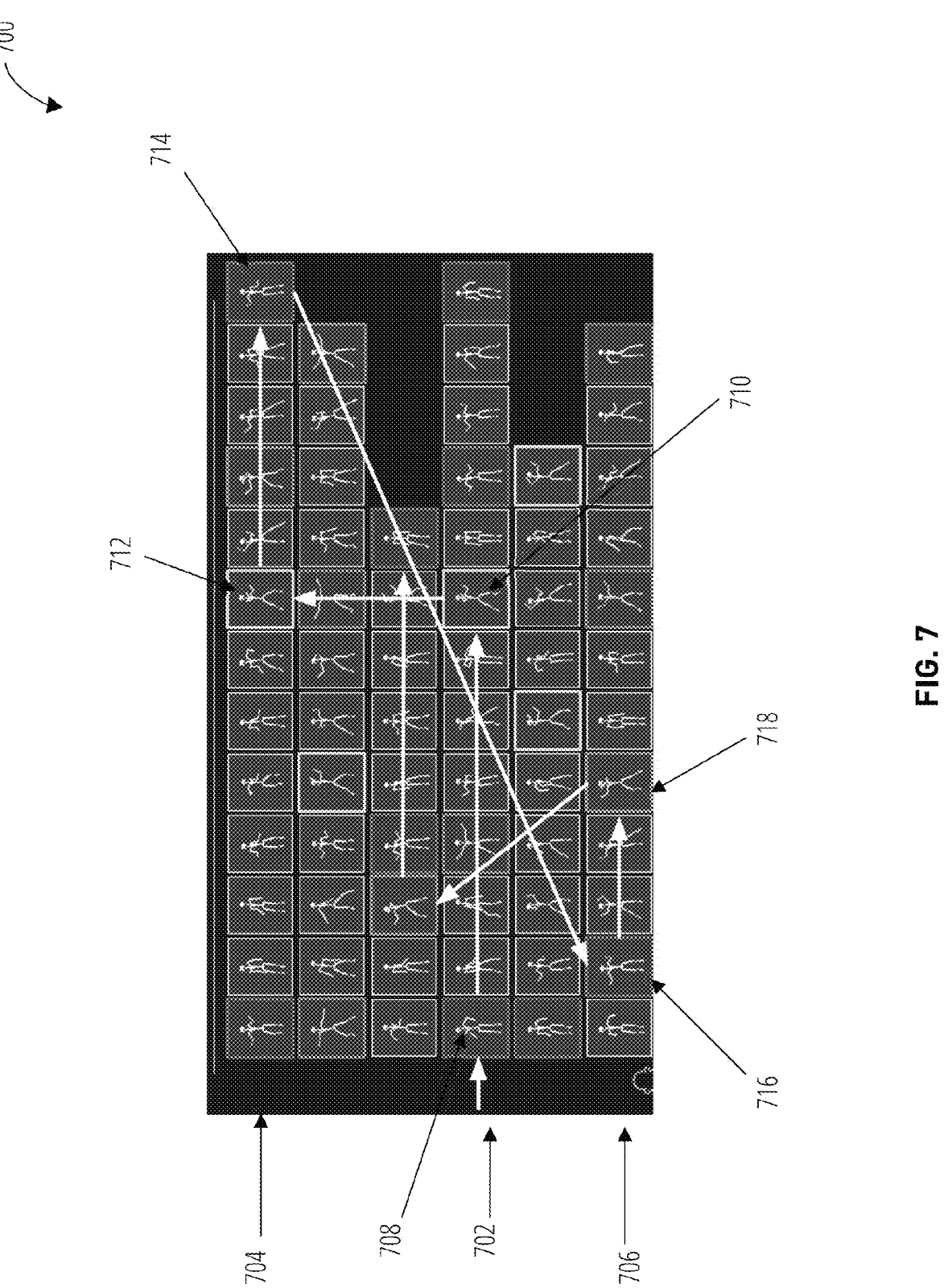
FIG. 7 illustrates an example of a transition graph 700 in accordance with one embodiment.

The dance track selector 504 receives the tempo value and the dance energy category generated by the music analyzer neural network 502 and selecting a plurality of dance tracks based on the tempo value and the dance energy category. The transition graph 600 in FIG. 6 and transition graph 700 in FIG. 7 are examples of transition graphs that are generated using the dance tracks selected by the dance track selector 504. As shown in FIG. 6, each dance track (e.g., dance track 602) can comprise a plurality of dance segments (e.g., segment 606) that include a plurality of movements (e.g., movement 604) that are sequential.

Populating the Database of Dance Tracks

The dance tracks can be stored in the animation table 320 of the database 304. During the training of the music analyzer neural network 502 or during the setup or update of the avatar animation system 232, the database 304 can be populated with a plurality of dance tracks.

Using videos of expert dancers that are dancing to music (e.g., songs, audio, acoustic signals), the interaction system 100 can populate the animation table 320 of the database 304 with a plurality of dance tracks.

In one example, a processor receives test videos including a dancer performing dance movements and the test acoustic signals. The test videos comprise test video segments which can be, for example, shorter portions (e.g., 3 seconds) of the test video segment. The test video segments also comprise a plurality of test video frames. For example, the test video segment can include 10 test video frames.

The processor determines body poses for each of the test video frames using skeletal approximation of the dancer. Skeletal approximation can be 2-dimensional or 3-dimensional skeletal approximation. The body poses can comprise joint positions and angles.

The processor maps the body poses for each of the test video frames to avatar body poses associated with an avatar skeleton. The processor then generates avatar test videos using the avatar body poses. The avatar test videos can include dance tracks. In one example, the dance tracks are selected from the avatar test videos and associated with a corresponding test tempo value and test dance energy category of the segment of the test acoustic signal. Accordingly, the database is populated with different dance tracks for a range of tempo values and for each of the dance energy categories (e.g., idle, slow, lively, and vigorous)

Dance Synthesizer

The dance synthesizer 506 receives the dance tracks from the dance track selector 504 and generates using the dance tracks the dance sequences for avatars. As shown in the transition graph 700, the dance synthesizer 506 can receive the six tracks included in transition graph 700 including the first dance track 702, second dance track 704, and third dance track 706. The dance synthesizer 506 generates a first dance segment by selecting a first starting movement 708 in the first dance track 702 and selects a first transition movement 710 in the first dance track 702. The first dance segment starts at the first starting movement 708 and ends at the first transition movement 710 and includes all the sequential movements between the first starting movement 708 and first transition movement 710. In one example, the dance synthesizer 506 selects a first transition movement 710 that is at least a predetermined time frame from the first starting movement 708. The predetermined time frame can be 15 seconds to ensure that the first dance segment is sufficiently long and thus, does not jump to a different dance segment too quickly. By implementing the predetermined time frame requirement, the resulting dance sequence that includes a first dance segment that is sufficiently long will appear to be a realistic and smoother dance performed by the avatars.

The dance synthesizer 506 then generates a second dance segment by identifying a second starting movement 712 in the second dance track 704 that is similar to the first transition movement 710 within a predetermined threshold. As shown in FIG. 7, the dance synthesizer 506 can further selects a second transition movement 714 in the second track. In this example, the second dance segment starts at the second starting movement 712 and ends at the second transition movement 714.

The first transition movement 710 and the second starting movement 712 are similar movements such that a dance sequence that transitions from the first transition movement 710 of the first dance track 702 to the second starting movement 712 of the second dance track 704 creates a seamless and realistic transition in the dance being performed. In this example, the dance sequences generated by the dance synthesizer 506 include the first dance segment and the second dance segment. For instance, the second dance segment is appended to the first dance segment in order to generate the dance sequences.

As shown in FIG. 7, the dance synthesizer 506 can further generate a third dance segment by identifying a third starting movement 716 in the third dance track 706 that is similar to the second transition movement 714 within the predetermined threshold. In this example, the third dance segment starts at the third starting movement 716 and the dance sequences also include the third dance segment after the second dance segment. The dance synthesizer 506 can also select a third transition movement 718 such that the third dance segment ends at the third transition movement 718.

Dance Animation Controller

The dance animation controller 508 receives the dance sequences from the dance synthesizer 506 and generates real-time animations for the avatars based on the dance sequences and avatar characteristics associated with the avatars. The dance animation controller 508 also causes to be displayed on a client device the real-time animations.

Process of Generating a Real-Time Avatar Animation

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

FIG. 8 illustrates a process 800 of generating a real-time avatar animation in accordance with one example. In one example, the processor in an avatar animation system 232, the processor in the client systems 102, the processor in the interaction server system 110 or any combination thereof, can perform the operations in process 800.

In operation 802, the processor receives a real-time acoustic signal comprising a plurality of acoustic segments.

In operation 804, the processor generates using a music analyzer neural network a tempo value and a dance energy category for each of the acoustic segments. The tempo value comprises a value indicating beats per minute. The dance energy category is one of: idle, slow, lively, or vigorous.

In one example, the processor generates the tempo value and the dance energy category for each of the acoustic segments based on test tempo values and test dance energy categories associated with the test acoustic segments. The test tempo values, the test dance energy categories and the test acoustic segments are used to train the music analyzer neural network.

In operation 806, the processor selects a plurality of dance tracks based on the tempo value and the dance energy category. Each of the plurality of dance tracks can comprise a plurality of dance segments including a plurality of movements that are sequential.

In operation 808, the processor generates using the dance tracks a first dance sequence for a first avatar and a second dance sequence for a second avatar. In one example, the processor generates the first dance sequence and the second dance sequence by generating a first dance segment and a second dance segment. The processor generates a first dance segment by selecting a first starting movement of the plurality of movements in a first track of the plurality of tracks, and selecting a first transition movement in the plurality of movements in the first track. The first dance segment starts at the first starting movement and ends at the first transition movement. The processor generates the second dance segment by identifying a second starting movement in a second dance track of the plurality of tracks that is similar to the first transition movement within a predetermined threshold. The second dance segment starts at the second starting movement. In this example, the first dance sequence and the second dance sequence include the first dance segment and the second dance segment.

The processor can further generate the first dance sequence and the second dance sequence to include a third dance segment. The processor can select a second transition movement in the plurality of movements in the second track and generate a third dance segment by identifying a third starting movement in a third dance track of the plurality of tracks that is similar to the second transition movement within the predetermined threshold. In this example, the second dance segment ends at the second transition movement and the third dance segment starts at the third starting movement.

In one example, the first dance sequence and the second dance sequence can be identical. In another example, the first dance sequence and the second dance sequence are different. In the example where the dance sequences are different, the processor can generate first dance sequence to comprise a first dance segment followed by the second dance segment and generate a second dance sequence to comprise a fourth dance segment and a fifth dance segment.

The processor can generate the fourth dance segment by selecting a different first starting movement of the plurality of movements in the first track and/or selecting a different first transition movement in the plurality of movements in the first track. In this example, the fourth dance segment can start at the different first starting movement and ends at the different first transition movement. The processor can also generate the fourth dance segment by selecting a fourth starting moving in a fourth track of the plurality of tracks and a fourth transition movement in the fourth track. In this example, the fourth dance segment starts at the fourth starting movement and ends at the fourth transition movement. The processor generates the fifth dance segment by identifying a fifth starting movement in a fifth dance track of the plurality of tracks that is similar to the fourth transition movement within a predetermined threshold. The fifth dance segment starts at the fifth starting movement.

In one example, the processor generates the first dance sequence and the second dance sequence based on a position of the first avatar displayed on the first client device and a position of the second avatar displayed on a first client device to prevent an overlapping display of the first avatar and the second avatar. For instance, the processor selects the first transition movement in the first dance segment to prevent the overlapping display of the first avatar and the second avatar or identifies the second starting movement in the second dance track to prevent the overlapping display of the first avatar and the second avatar. To prevent the overlapping display of the first avatar and the second avatar, the processor can perform a look-ahead that is used to inform the selection of the first transition movement or the identification of the second starting movement. Thus, when the processor chooses the transition, the processor predicts if a collision between the displayed avatars will occur based on the dance transition and selects a transition that results in non-collision of the displayed dancing avatars.

In operation 810, the processor generates a first real-time animation of the first avatar and a second real-time animation of a second avatar based on the first dance sequence and the second dance sequence and a plurality of avatar characteristics associated with the first avatar and the second avatar. The avatar characteristics of a first user are associated with the first avatar and the avatar characteristics of a second user are associated with the second avatar.

In operation 812, the processor causes to be displayed on a first client device the first real-time animation of the first avatar and the second real-time animation of the second avatar. In one example, the processor also causes to be displayed the real-time animation of the first avatar and the second avatar on a second client device. The first client device can be associated with the first user and the first avatar and the second client device can be associated with the second user and the second avatar.

In one example, the processor can further train the music analyzer neural network by receiving a plurality of test acoustic signals including a plurality of test acoustic segments. The processor determines a plurality of test tempo values associated with the test acoustic segments, and associates each of the test acoustic segments with one of a plurality of test dance energy categories that include idle, slow, lively, and vigorous. Associating each of the test acoustic segments with one of the test dance energy categories can be based on music features of the test acoustic segments. The music features comprise frequency response, chromagram, tempogram, or any combination thereof. In another example, the processor receives an input that identifies the one of the test dance energy categories to be associated with the test acoustic segment from a training agent (e.g., human, computer, third-party server, etc.).

The processor can also generate the dance tracks that are used to generate the dance sequences and the real-time animations. To generate the dance tracks and populate the database with dance tracks, the processor receives a plurality of test videos including a dancer performing dance movements and the test acoustic signals. The test videos comprise a plurality of test video segments. Each of the test video segments comprises a plurality of test video frames. The processor determines body poses for each of the test video frames using skeletal approximation of the dancer. The body poses can include data related to the joint positions and angles. The processor maps the body poses for each of the test video frames to a plurality of avatar body poses associated with an avatar skeleton and generates a plurality of avatar test videos using the plurality of avatar body poses. The plurality of avatar test videos comprise the plurality of dance tracks. In one example, the processor selects the dance tracks from the avatar test videos and stores the dance tracks in the database in association with the corresponding test tempo value and the corresponding test dance energy category.

Improving the avatar dance animations to correspond to the music being played in real-time renders a more realistic response by the avatar to the music. Accordingly, embodiments of the present disclosure improve the functionality of avatar animation systems by using the music analyzer neural network 502 to generate a tempo value and dance energy category for each segment of a song being played which is further used to inform the dance track selector 504's selection of dance tracks and the dance synthesizer 506's generation of dynamic and varied dance sequences used to generate the avatar's dancing animation in real-time by the dance animation controller 508. This improvement will further improve usage of avatars and drive the user engagement on each of the platforms displaying the avatars.

System with Head-Wearable Apparatus

Figure 9:
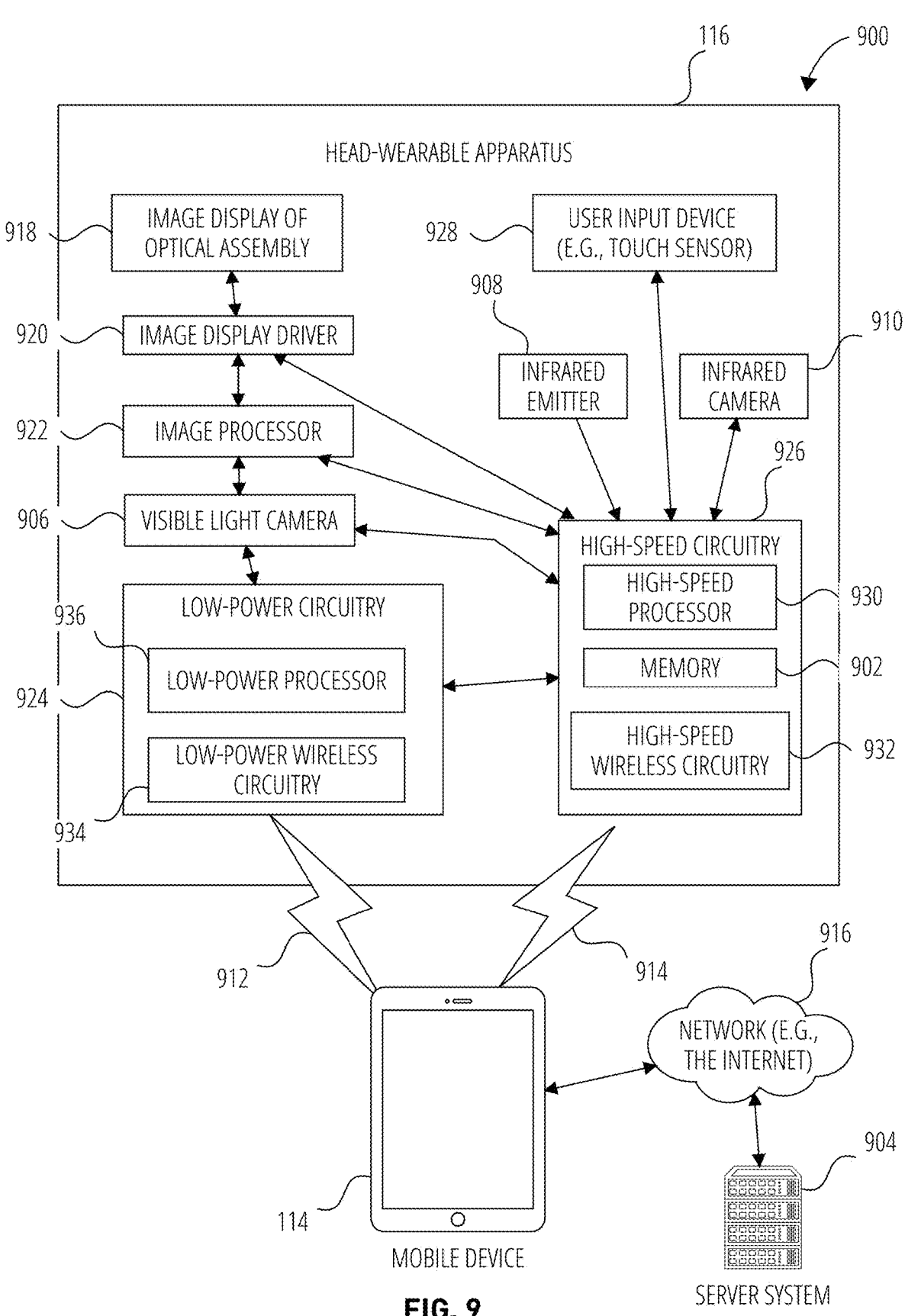
FIG. 9 illustrates a system in which the head-wearable apparatus, according to some examples.

FIG. 9 illustrates a system 900 including a head-wearable apparatus 116, according to some examples. FIG. 9 is a high-level functional block diagram of an example head-wearable apparatus 116 communicatively coupled to a mobile device 114 and various server systems 904 (e.g., the interaction server system 110) via various networks 108.

The head-wearable apparatus 116 includes one or more cameras, each of which may be, for example, a visible light camera 906, an infrared emitter 908, and an infrared camera 910.

The mobile device 114 connects with head-wearable apparatus 116 using both a low-power wireless connection 912 and a high-speed wireless connection 914. The mobile device 114 is also connected to the server system 904 and the network 916.

The head-wearable apparatus 116 further includes two image displays of the image display of optical assembly 918. The two image displays of optical assembly 918 include one associated with the left lateral side and one associated with the right lateral side of the head-wearable apparatus 116. The head-wearable apparatus 116 also includes an image display driver 920, an image processor 922, low-power circuitry 924, and high-speed circuitry 926. The image display of optical assembly 918 is for presenting images and videos, including an image that can include a graphical user interface to a user of the head-wearable apparatus 116.

The image display driver 920 commands and controls the image display of optical assembly 918. The image display driver 920 may deliver image data directly to the image display of optical assembly 918 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 928 (e.g., touch sensor or push button), including an input surface on the head-wearable apparatus 116. The user input device 928 (e.g., touch sensor or push button) is to receive from the user an input selection to manipulate the graphical user interface of the presented image.

The components shown in FIG. 9 for the head-wearable apparatus 116 are located on one or more circuit boards, for example a PCB or flexible PCB, in the rims or temples. Alternatively, or additionally, the depicted components can be located in the chunks, frames, hinges, or bridge of the head-wearable apparatus 116. Left and right visible light cameras 906 can include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 902, which stores instructions to perform a subset or all of the functions described herein. The memory 902 can also include storage device.

As shown in FIG. 9, the high-speed circuitry 926 includes a high-speed processor 930, a memory 902, and high-speed wireless circuitry 932. In some examples, the image display driver 920 is coupled to the high-speed circuitry 926 and operated by the high-speed processor 930 in order to drive the left and right image displays of the image display of optical assembly 918. The high-speed processor 930 may be any processor capable of managing high-speed communications and operation of any general computing system needed for the head-wearable apparatus 116. The high-speed processor 930 includes processing resources needed for managing high-speed data transfers on a high-speed wireless connection 914 to a wireless local area network (WLAN) using the high-speed wireless circuitry 932. In certain examples, the high-speed processor 930 executes an operating system such as a LINUX operating system or other such operating system of the head-wearable apparatus 116, and the operating system is stored in the memory 902 for execution. In addition to any other responsibilities, the high-speed processor 930 executing a software architecture for the head-wearable apparatus 116 is used to manage data transfers with high-speed wireless circuitry 932. In certain examples, the high-speed wireless circuitry 932 is configured to implement Institute of Electrical and Electronic Engineers (IEEE) 802.11 communication standards, also referred to herein as WiFi. In some examples, other high-speed communications standards may be implemented by the high-speed wireless circuitry 932.

The low-power wireless circuitry 934 and the high-speed wireless circuitry 932 of the head-wearable apparatus 116 can include short-range transceivers (Bluetooth™) and wireless wide, local, or wide area network transceivers (e.g., cellular or WiFi). Mobile device 114, including the transceivers communicating via the low-power wireless connection 912 and the high-speed wireless connection 914, may be implemented using details of the architecture of the head-wearable apparatus 116, as can other elements of the network 916.

The memory 902 includes any storage device capable of storing various data and applications, including, among other things, camera data generated by the left and right visible light cameras 906, the infrared camera 910, and the image processor 922, as well as images generated for display by the image display driver 920 on the image displays of the image display of optical assembly 918. While the memory 902 is shown as integrated with high-speed circuitry 926, in some examples, the memory 902 may be an independent standalone element of the head-wearable apparatus 116. In certain such examples, electrical routing lines may provide a connection through a chip that includes the high-speed processor 930 from the image processor 922 or the low-power processor 936 to the memory 902. In some examples, the high-speed processor 930 may manage addressing of the memory 902 such that the low-power processor 936 will boot the high-speed processor 930 any time that a read or write operation involving memory 902 is needed.

As shown in FIG. 9, the low-power processor 936 or high-speed processor 930 of the head-wearable apparatus 116 can be coupled to the camera (visible light camera 906, infrared emitter 908, or infrared camera 910), the image display driver 920, the user input device 928 (e.g., touch sensor or push button), and the memory 902.

The head-wearable apparatus 116 is connected to a host computer. For example, the head-wearable apparatus 116 is paired with the mobile device 114 via the high-speed wireless connection 914 or connected to the server system 904 via the network 916. The server system 904 may be one or more computing devices as part of a service or network computing system, for example, that includes a processor, a memory, and network communication interface to communicate over the network 916 with the mobile device 114 and the head-wearable apparatus 116.

The mobile device 114 includes a processor and a network communication interface coupled to the processor. The network communication interface allows for communication over the network 916, low-power wireless connection 912, or high-speed wireless connection 914. Mobile device 114 can further store at least portions of the instructions for generating binaural audio content in the mobile device 114's memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 920. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 904, such as the user input device 928, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over low-power wireless connections 912 and high-speed wireless connection 914 from the mobile device 114 via the low-power wireless circuitry 934 or high-speed wireless circuitry 932.

Machine Architecture

Figure 10:
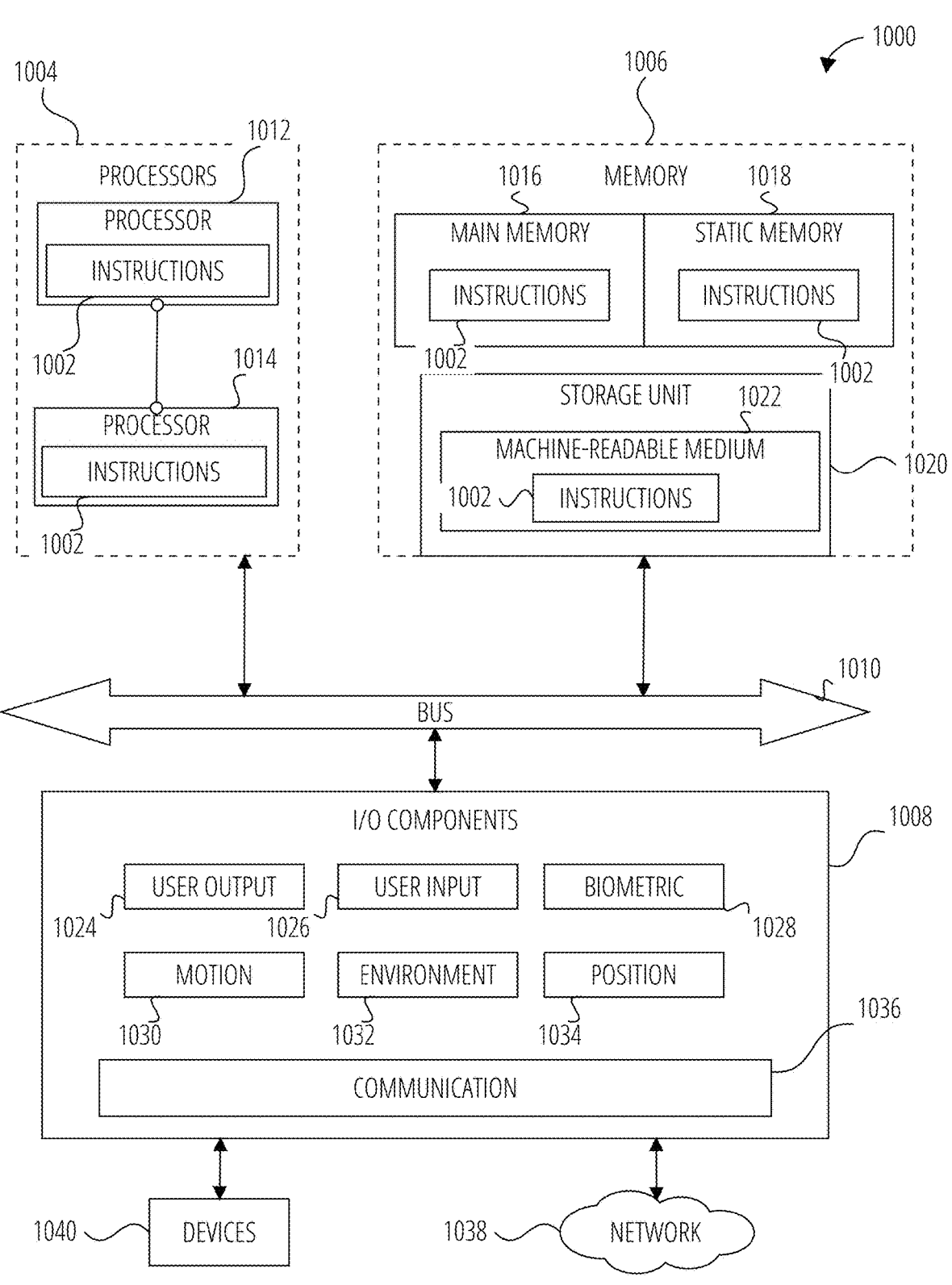
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O) components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
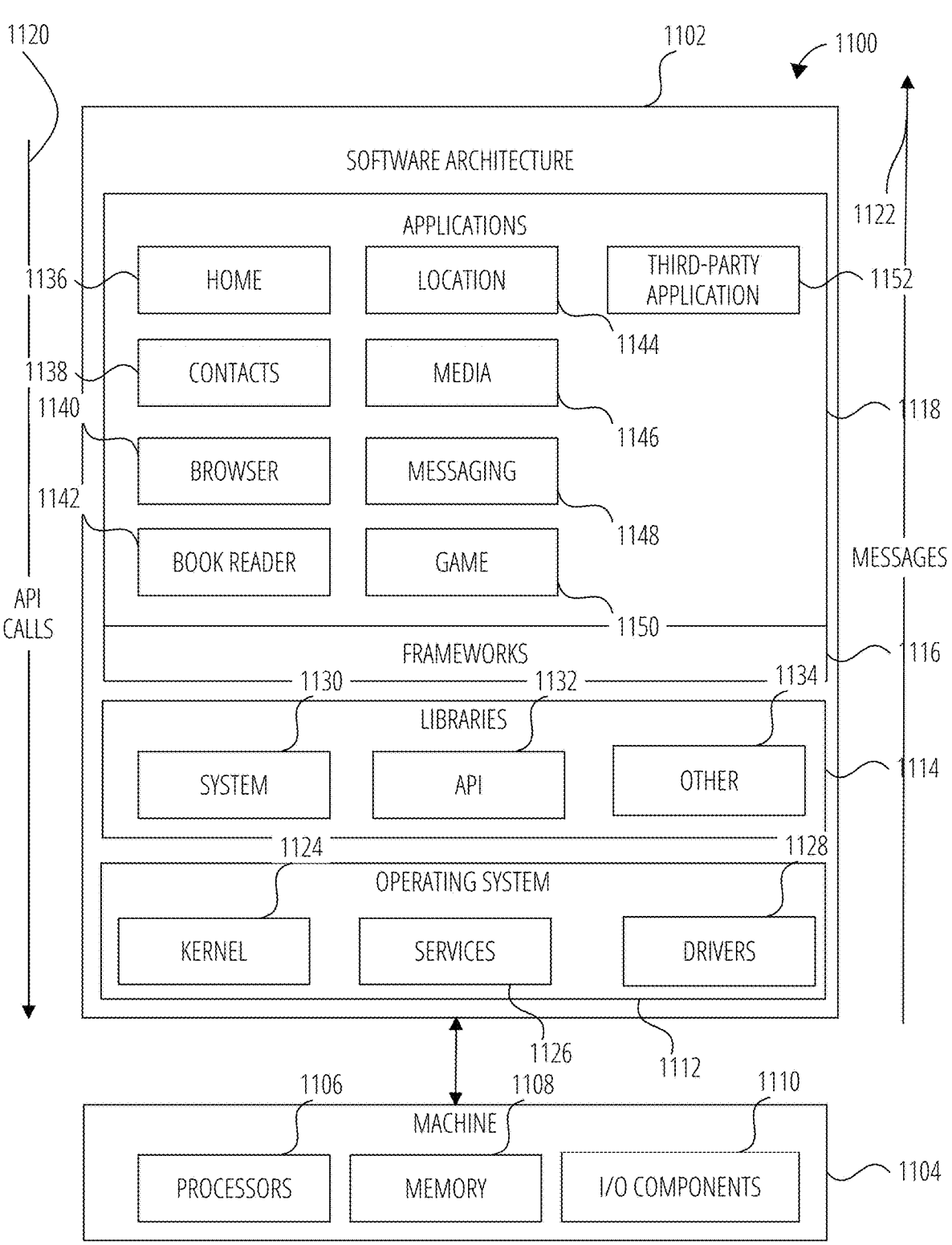
FIG. 11 is a block diagram showing a software architecture within which examples may be implemented.

FIG. 11 is a block diagram 1100 illustrating a software architecture 1102, which can be installed on any one or more of the devices described herein. The software architecture 1102 is supported by hardware such as a machine 1104 that includes processors 1106, memory 1108, and I/O components 1110. In this example, the software architecture 1102 can be conceptualized as a stack of layers, where each layer provides a particular functionality. The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 can provide other common services for the other software layers. The drivers 1128 are responsible for controlling or interfacing with the underlying hardware. For instance, the drivers 1128 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 can include system libraries 1130 (e.g., C standard library) that provide functions such as memory allocation functions, string manipulation functions, mathematic functions, and the like. In addition, the libraries 1114 can include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 can provide a broad spectrum of other APIs that can be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages can be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 can invoke the API calls 1120 provided by the operating system 1112 to facilitate functionalities described herein.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API) The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action, or an interaction with other users or computer systems.

What is claimed is:

1. A method comprising:

receiving, by a processor, a real-time acoustic signal comprising a plurality of acoustic segments;

generating using a music analyzer neural network a tempo value and a dance energy category for each of the acoustic segments;

selecting a plurality of dance tracks based on the tempo value and the dance energy category, wherein each of the plurality of dance tracks comprises a plurality of dance segments including a plurality of movements that are sequential;

generating using the dance tracks a first dance sequence for a first avatar and a second dance sequence for a second avatar, wherein generating the first dance sequence and the second dance sequence comprises:

generating a first dance segment by selecting a first starting movement of the plurality of movements in a first track of the plurality of tracks, and selecting a first transition movement in the plurality of movements in the first track, wherein the first dance segment starts at the first starting movement and ends at the first transition movement, and generating a second dance segment by identifying a second starting movement in a second dance track of the plurality of tracks that is similar to the first transition movement within a predetermined threshold, wherein the second dance segment starts at the second starting movement, wherein the first dance sequence and the second dance sequence include the first dance segment and the second dance segment;

generating a first real-time animation of the first avatar and a second real-time animation of a second avatar based on the first dance sequence and the second dance sequence and a plurality of avatar characteristics associated with the first avatar and the second avatar; and causing to be displayed on a first client device the first real-time animation of the first avatar and the second real-time animation of the second avatar.

2. The method of claim 1, wherein generating the first dance sequence and the second dance sequence further comprises:

selecting a second transition movement in the plurality of movements in the second track, wherein the second dance segment ends at the second transition movement; and generating a third dance segment by identifying a third starting movement in a third dance track of the plurality of tracks that is similar to the second transition movement within the predetermined threshold, wherein the third dance segment starts at the third starting movement, wherein the first dance sequence and the second dance sequence include the third dance segment.

3. The method of claim 1, wherein the tempo value comprises a value indicating beats per minute, and wherein the dance energy category is one of: idle, slow, lively, or vigorous.

4. The method of claim 3, further comprising:

training the music analyzer neural network, wherein training the music analyzer neural network comprises:

receiving a plurality of test acoustic signals including a plurality of test acoustic segments, determining a plurality of test tempo values associated with the test acoustic segments, and associating each of the test acoustic segments with one of a plurality of test dance energy categories, wherein the test dance energy categories comprise idle, slow, lively, and vigorous.

5. The method of claim 4, wherein associating each of the test acoustic segments with one of the test dance energy categories is based on music features of the test acoustic segments, wherein the music features comprise frequency response, chromagram, tempogram, or any combination thereof.

6. The method of claim 5, wherein generating using the music analyzer neural network a tempo value and a dance energy category further comprises:

generating the tempo value and the dance energy category for each of the acoustic segments based on the test tempo values and the test dance energy categories associated with the test acoustic segments.

7. The method of claim 4, further comprising:

receiving a plurality of test videos including a dancer performing dance movements and the test acoustic signals, the test videos comprising a plurality of test video segments, wherein each of the test video segments comprises a plurality of test video frames; and determining body poses for each of the test video frames using skeletal approximation of the dancer, wherein the body poses comprise joint positions and angles.

8. The method of claim 7, further comprising:

mapping the body poses for each of the test video frames to a plurality of avatar body poses associated with an avatar skeleton; and generating a plurality of avatar test videos using the plurality of avatar body poses.

9. The method of claim 8, wherein the plurality of avatar test videos comprise the plurality of dance tracks.

10. The method of claim 1, wherein generating the first dance sequence and the second dance sequence further comprises:

generating the first dance sequence and the second dance sequence based on a position of the first avatar displayed on the first client device and a position of the second avatar displayed on the first client device to prevent an overlapping display of the first avatar and the second avatar.

11. The method of claim 10, wherein the first transition movement in the first dance segment is selected to prevent the overlapping display of the first avatar and the second avatar.

12. The method of claim 10, wherein the second starting movement in the second dance track is identified to prevent the overlapping display of the first avatar and the second avatar.

13. The method of claim 1, further comprising:

causing to be displayed on a second client device the real-time animation of the first avatar and the second avatar.

14. The method of claim 1, wherein the first client device is associated with a first user and the second client device is associated with a second user, wherein the first user is associated with the first avatar, and the second user is associated with the second avatar.

15. A system comprising:

a processor; and a memory storing instructions that, when executed by the processor, cause the system to perform operations comprising:

receiving a real-time acoustic signal comprising a plurality of acoustic segments;

generating using a music analyzer neural network a tempo value and a dance energy category for each of the acoustic segments;

selecting a plurality of dance tracks based on the tempo value and the dance energy category, wherein each of the plurality of dance tracks comprises a plurality of dance segments including a plurality of movements that are sequential;

generating using the dance tracks a first dance sequence for a first avatar and a second dance sequence for a second avatar, wherein generating the first dance sequence and the second dance sequence comprises:

generating a first dance segment by selecting a first starting movement of the plurality of movements in a first track of the plurality of tracks, and selecting a first transition movement in the plurality of movements in the first track, wherein the first dance segment starts at the first starting movement and ends at the first transition movement, and generating a second dance segment by identifying a second starting movement in a second dance track of the plurality of tracks that is similar to the first transition movement within a predetermined threshold, wherein the second dance segment starts at the second starting movement, wherein the first dance sequence and the second dance sequence include the first dance segment and the second dance segment;

generating a first real-time animation of the first avatar and a second real-time animation of a second avatar based on the first dance sequence and the second dance sequence and a plurality of avatar characteristics associated with the first avatar and the second avatar; and causing to be displayed on a first client device the first real-time animation of the first avatar and the second real-time animation of the second avatar.

16. The system of claim 15, wherein the tempo value comprises a value indicating beats per minute, and wherein the dance energy category is one of: idle, slow, lively, or vigorous.

17. The system of claim 16, wherein the system to perform operations further comprising:

training the music analyzer neural network, wherein training the music analyzer neural network comprises:

receiving a plurality of test acoustic signals including a plurality of test acoustic segments, determining a plurality of test tempo values associated with the test acoustic segments, and associating each of the test acoustic segments with one of a plurality of test dance energy categories, wherein the test dance energy categories comprise idle, slow, lively, and vigorous.

18. The system of claim 17, wherein generating using the music analyzer neural network a tempo value and a dance energy category further comprises:

generating the tempo value and the dance energy category for each of the acoustic segments based on the test tempo values and the test dance energy categories associated with the test acoustic segments.

19. The system of claim 17, wherein the system to perform operations further comprising:

receiving a plurality of test videos including a dancer performing dance movements and the test acoustic signals, the test videos comprising a plurality of test video segments, wherein each of the test video segments comprises a plurality of test video frames;

determining body poses for each of the test video frames using skeletal approximation of the dancer, wherein the body poses comprise joint positions and angles;

mapping the body poses for each of the test video frames to a plurality of avatar body poses associated with an avatar skeleton; and generating a plurality of avatar test videos using the plurality of avatar body poses, wherein the plurality of avatar test videos comprise the plurality of dance tracks.

20. The system of claim 15, wherein generating the first dance sequence and the second dance sequence further comprises:

generating the first dance sequence and the second dance sequence based on a position of the first avatar displayed on the first client device and a position of the second avatar displayed on the first client device to prevent an overlapping display of the first avatar and the second avatar, wherein the first transition movement in the first dance segment is selected to prevent the overlapping display of the first avatar and the second avatar, or wherein the second starting movement in the second dance track is identified to prevent the overlapping display of the first avatar and the second avatar.

21. A non-transitory computer-readable storage medium having stored thereon instructions that when executed by a processor, cause the processor to perform operations comprising:

receiving a real-time acoustic signal comprising a plurality of acoustic segments;

generating using a music analyzer neural network a tempo value and a dance energy category for each of the acoustic segments;

selecting a plurality of dance tracks based on the tempo value and the dance energy category, wherein each of the plurality of dance tracks comprises a plurality of dance segments including a plurality of movements that are sequential;

generating using the dance tracks a first dance sequence for a first avatar and a second dance sequence for a second avatar, wherein generating the first dance sequence and the second dance sequence comprises:

generating a first dance segment by selecting a first starting movement of the plurality of movements in a first track of the plurality of tracks, and selecting a first transition movement in the plurality of movements in the first track, wherein the first dance segment starts at the first starting movement and ends at the first transition movement, and generating a second dance segment by identifying a second starting movement in a second dance track of the plurality of tracks that is similar to the first transition movement within a predetermined threshold, wherein the second dance segment starts at the second starting movement, wherein the first dance sequence and the second dance sequence include the first dance segment and the second dance segment;

generating a first real-time animation of the first avatar and a second real-time animation of a second avatar based on the first dance sequence and the second dance sequence and a plurality of avatar characteristics associated with the first avatar and the second avatar; and causing to be displayed on a first client device the first real-time animation of the first avatar and the second real-time animation of the second avatar.

* * * * *